(12) United States Patent
Nelles et al.

(10) Patent No.: US 8,932,657 B2
(45) Date of Patent: Jan. 13, 2015

(54) METHODS AND APPARATUSES FOR MAKING PASTA FILATA

(71) Applicant: Johnson Industries International, Inc., Windsor, WI (US)

(72) Inventors: Peter F. Nelles, Blue Mounds, WI (US); Gary L. Nesheim, Delafield, WI (US); Grant L. Nesheim, Mazomanie, WI (US)

(73) Assignee: Johnson Industries International, Inc., Windsor, WI (US)

( * ) Notice: Subject to any disclaimer, the term of this patent is extended or adjusted under 35 U.S.C. 154(b) by 0 days.

(21) Appl. No.: 14/106,001

(22) Filed: Dec. 13, 2013

(65) Prior Publication Data

US 2014/0170276 A1 Jun. 19, 2014

Related U.S. Application Data

(60) Provisional application No. 61/736,896, filed on Dec. 13, 2012.

(51) Int. Cl.
| | | |
|---|---|---|
| *A23C 19/06* | (2006.01) | |
| *A23C 19/068* | (2006.01) | |
| *A23L 1/025* | (2006.01) | |
| *A01J 25/00* | (2006.01) | |

(52) U.S. Cl.
CPC ........... *A23C 19/0684* (2013.01); *A23L 1/0255* (2013.01); *A01J 25/008* (2013.01)
USPC ............ 426/241; 426/582; 426/519; 426/520

(58) Field of Classification Search
CPC ....... A01J 25/008; A01J 25/002; A01J 25/06; A01J 25/12; A23C 19/0684; A23C 19/081; A23C 19/06; A23C 19/0973; A23L 1/0128; A23L 1/0255; A23P 1/105
USPC .......................... 426/241–243, 582, 518–520; 219/698–701

See application file for complete search history.

(56) References Cited

U.S. PATENT DOCUMENTS

| | | | | |
|---|---|---|---|---|
| 2,733,148 | A * | 1/1956 | Russo ........................... | 426/582 |
| 2,781,269 | A * | 2/1957 | Harper et al. .................... | 426/36 |
| 2,908,575 | A * | 10/1959 | Spiess, Jr. et al. .............. | 426/36 |
| 3,394,011 | A * | 7/1968 | Richardson et al. ............ | 426/36 |
| 3,899,596 | A * | 8/1975 | Stenne ........................... | 426/40 |
| 3,961,077 | A | 6/1976 | Kielsmeier | |
| 4,622,228 | A | 11/1986 | Ikeuchi et al. | |
| 5,165,948 | A * | 11/1992 | Thomas ........................ | 426/242 |
| 5,358,730 | A | 10/1994 | Dame-Cahagne et al. | |
| 5,514,853 | A * | 5/1996 | Le Viet ......................... | 219/700 |

(Continued)

FOREIGN PATENT DOCUMENTS

| | | | |
|---|---|---|---|
| JP | 07143844 A | * | 6/1995 |
| WO | WO9953749 | | 10/1999 |

OTHER PUBLICATIONS

International Search Report and Written Opinion for PCT/US2013/074969 dated Mar. 24, 2014, 10 pages.

*Primary Examiner* — Drew Becker
(74) *Attorney, Agent, or Firm* — Whyte Hirschboeck Dudek S.C.

(57) ABSTRACT

The disclosure relates to methods and apparatuses for the production of cheese. In one embodiment, the disclosure relates to methods and apparatuses for making pasta filata cheese. In one embodiment, a microwave system is used for the production of pasta filata cheese.

14 Claims, 4 Drawing Sheets

(56) References Cited

U.S. PATENT DOCUMENTS

| | | |
|---|---|---|
| 5,595,775 A * | 1/1997 | Tishel ............... 426/241 |
| 5,750,177 A | 5/1998 | Yee et al. |
| 5,942,263 A | 8/1999 | Chen et al. |
| 5,945,022 A * | 8/1999 | Volpe et al. ............ 219/707 |
| 6,086,926 A | 7/2000 | Bruce et al. |
| 6,120,809 A | 9/2000 | Rhodes |
| 6,180,153 B1 * | 1/2001 | Palus et al. ............ 426/517 |
| RE37,264 E | 7/2001 | Chen et al. |
| 6,524,632 B2 * | 2/2003 | Kartchner ............ 426/55 |
| 6,780,445 B1 | 8/2004 | Rhodes |
| 6,989,170 B2 * | 1/2006 | Konanayakam et al. ..... 426/243 |
| 7,291,356 B2 * | 11/2007 | Merrill et al. ............ 426/582 |
| 7,550,279 B2 | 6/2009 | Nickel |
| 7,579,033 B2 | 8/2009 | Merrill et al. |
| 7,582,323 B2 | 9/2009 | Aird et al. |
| 7,585,537 B2 | 9/2009 | Merrill et al. |
| 7,651,715 B2 | 1/2010 | Merrill et al. |
| 7,666,458 B2 | 2/2010 | Merrill et al. |
| 7,713,564 B2 | 5/2010 | Merrill et al. |
| 7,955,814 B2 | 6/2011 | Dekreij et al. |
| 7,976,886 B2 | 7/2011 | Merrill et al. |
| 8,021,704 B2 | 9/2011 | Merrill et al. |
| 8,241,691 B2 | 8/2012 | Merrill et al. |
| 8,603,554 B2 | 12/2013 | Merrill et al. |
| 8,613,970 B2 | 12/2013 | Merrill et al. |
| 8,628,810 B2 | 1/2014 | Barbano et al. |
| 2005/0249853 A1 * | 11/2005 | Merrill et al. ............ 426/582 |
| 2008/0131557 A1 * | 6/2008 | Isse et al. ............ 426/39 |
| 2010/0209584 A1 | 8/2010 | Weibel |
| 2010/0239713 A1 | 9/2010 | Merrill et al. |

* cited by examiner

_US 8,932,657 B2_

METHODS AND APPARATUSES FOR MAKING PASTA FILATA

CROSS REFERENCE TO RELATED APPLICATIONS

This application is a non-provisional patent application of and claims priority to Provisional Patent Application No. 61/736,896 filed Dec. 13, 2012, which is incorporated herein by reference in its entirety.

FIELD

The disclosure relates to methods and apparatuses for the production of cheese. In one embodiment, the disclosure relates to methods and apparatuses for making pasta filata cheese. In one embodiment, a microwave system is used for the production of cheese.

BACKGROUND

Recently there has been an increase in the demand for cheeses that have widely differing performance characteristics. This particular demand is driven in part by the increasing variety of prepared foods in which such cheeses are included. In fact, there often is a need for different performance qualities even for foods of the same general type because of the different ways cheeses are utilized or because the cheese is exposed to differing cooking environments or conditions. Pizzas illustrate this point well because there are so many different types of pizzas. Pizzas, for example, have widely differing crusts, including thick, thin, or somewhere in between. The cheese can also be exposed or wrapped in the edge of the crust. Furthermore, the crust may be completely uncooked or it may be part-baked before being put in the oven with the cheese. Each of these variables potentially impacts the composition of the cheese required to provide satisfactory performance.

There are a variety of challenges to providing cheeses that have a composition which satisfies the desired performance characteristics and nutritional qualities. For instance, it can be difficult to obtain the desired concentration level of some ingredients in a cheese. Another problem is developing a process that activates the latent functional properties of certain ingredients. Another problem is that many methods for preparing cheese involve the loss of significant quantities of some cheese components during processing. This can occur, for instance, when such cheeses undergo the heating and stretching process of the pasta filata process. Often the heating is conducted in heated water, which can remove significant amounts of cheese ingredients.

In general terms, it is possible to state that all pasta filata cheeses are obtained by a working scheme essentially comprising the following steps: milk treatment, acidification (by adding ferments or organic acids such as citric acid), addition of rennet, curdling, cutting of the curd, extraction of whey, kneading and stretching in hot water ("filatura"), shaping, cooling and stiffening, packaging with or without a conservation (preserving) liquid of the final product. Therefore, differences that can be found in the different preparations are due to the kind of milk used and to the variation of technology adopted, and the products thus obtained are quite similar to one another.

For the cooker-stretcher step for pasta filata, a circulating hot water system is usually used. This heats the mass of curd to the target temperature (usually between 125 and 142 F). In this step a significant amount of cheese solids may be lost to the cooker water. Significant amount of resources are dedicated for the retention of the solids and the disposal of liquids.

Pasta filata cheese needs to mature for a period of time before it is ready to exhibit the target functionality. But after a period of time, the product loses its functionality, thus the cheese has a performance window. To reduce inventory, there is always a need to have faster maturation.

In view of the high demand for cheese and the foregoing shortcomings associated with some existing methods for preparing such cheeses with the desired performance characteristics, there thus remains a need for additional methods for preparing cheeses of these types.

BRIEF SUMMARY

The disclosure relates to a method of making a pasta filata cheese. In one embodiment, the method comprises heating a pasta filata-type cheese curd using microwave energy. To optimize quality of the pasta filata cheese, various ingredients may be added before or after heating the cheese curd with microwave energy.

In one embodiment, the disclosure relates to a method for making pasta filata cheese comprising: (a) manipulating cheese curd to a desired shape, size or volume; and (b) heating the cheese curd of step (a) with microwave energy.

In one embodiment, the disclosure relates to a method for making pasta filata cheese comprising: (a) heating cheese curd in a chamber with a microwave energy source, wherein the microwave energy source operates at a power selected from the group consisting of: from about 30 kw to about 400 kw, from about 50 to about 225 kw, from about 55 to about 220 kw, from about 60 to about 215 kw, from about 65 to about 210 kw, from about 70 to about 200 kw, from about 75 to about 195 kw, from about 80 to about 190 kw, and from about 85 to about 185 kw.

In yet another embodiment, the disclosure relates to a method for making pasta filata cheese comprising: (a) manipulating cheese curd to create a uniform heating profile; and (b) heating cheese curd from step (a) in a chamber comprising a microwave energy source.

In one embodiment, the disclosure relates to a method of making pasta filata cheese comprising heating cheese curd using energy from a microwave system, wherein the microwave system operates from about 10 to about 20 kw, from about 20 to about 30 kw, from about 30 to about 40 kw, from about 40 to about 50 kw, from about 50 to about 60, from about 60 to about 70 kw, from about 70 to about 80 kw, from about 80 to about 90 kw, from about 90 to about 100 kw, from about 100 to about 110 kw, from about 110 to about 120 kw, from about 120 to about 130 kw, from about 130 to about 140 kw, from about 14 to about 150 kw, from about 150 to about 160 kw, from about 160 to about 170 kw, from about 170 to about 180 kw, from about 180 to about 190 kw, from about 190 to about 200 kw, from about 200 to about 210 kw, from about 210 to about 220 kw, from about 220 to about 230 kw, from about 230 to about 240 kw, from about 240 to about 250 kw, from about 250 to about 260 kw, from about 260 to about 270 kw, from about 270 to about 280 kw, from about 280 to about 290 kw, and from about 290 to about 300 kW of power.

In one embodiment, a conveyor belt is used to move the cheese curd through the microwave system. Moreover, the aforementioned method can be carried out by use of an apparatus that allows adjusting the heating time by controlling the speed of the conveyor or transporter belt.

In one embodiment the speed of the conveyor belt is from about 5 in/min to about 360 in/min. In yet another embodiment, the cheese curd remains in the microwave system for a period of time selected from the group consisting of 3-5, 5-10, 10-15, 15-30, 30-45, 45-60, 60-65, 65-75, 75-85, and 85-90 seconds.

In another embodiment, the disclosure relates to a system for, heating cheese comprising a product leveling apparatus for shaping or sizing the cheese curd, and a microwave system for heating cheese curd.

In another embodiment, the disclosure relates to a system for heating cheese comprising a product leveling apparatus for shaping or sizing the cheese curd, a sensor for determining the profile of the shaped or sized cheese curd, and a microwave system for heating cheese curd. In one embodiment, the sensor determines a heating profile. In still yet another embodiment, the sensor is a three-dimensional sensor.

In another embodiment, the disclosure relates to a system for heating cheese comprising a product leveling apparatus for shaping or sizing the cheese curd, a microwave system for heating cheese curd, and a housing comprising augers for mixing and stretching the cheese curd.

In another embodiment, the disclosure relates to a system for heating cheese comprising a cyclone with a transfer tube for receiving cheese curd, a product leveling apparatus for shaping the cheese curd received from the cyclone; an ingredient dispenser for adding ingredients to the shaped cheese curd, and a microwave system for heating the cheese curd. In another embodiment, the system comprises a mechanical belt for transporting cheese. In still another embodiment, the system comprises a clean in place mechanism for cleaning the conveyor or transporting belt during the production run to prevent over heating of some cheese particulate.

An advantage of the methods disclosed herein is that better solids retention and increased product yield ranging from about 0.5% by weight to about 2% by weight as compared to traditional methods of making pasta filata will be achieved.

An advantage of the methods and systems disclosed herein is that the microwave energy source is separate from the mixer/extruder.

An advantage of the methods and systems disclosed herein is that the chamber comprising the microwave energy source is separate from the mixer/extruder.

An advantage of the methods and systems disclosed herein is after heating with a microwave system, the curd can be stretched at a lower pH.

An advantage of the methods and systems disclosed herein is the that the microwave system is not used as a stretcher.

An advantage of the methods and systems disclosed herein is that the microwave system is used as a cooker.

An advantage of the methods and systems disclosed herein is that a stretcher is a separate apparatus from the microwave system.

DETAILED DESCRIPTION

Definitions

Figure 1:
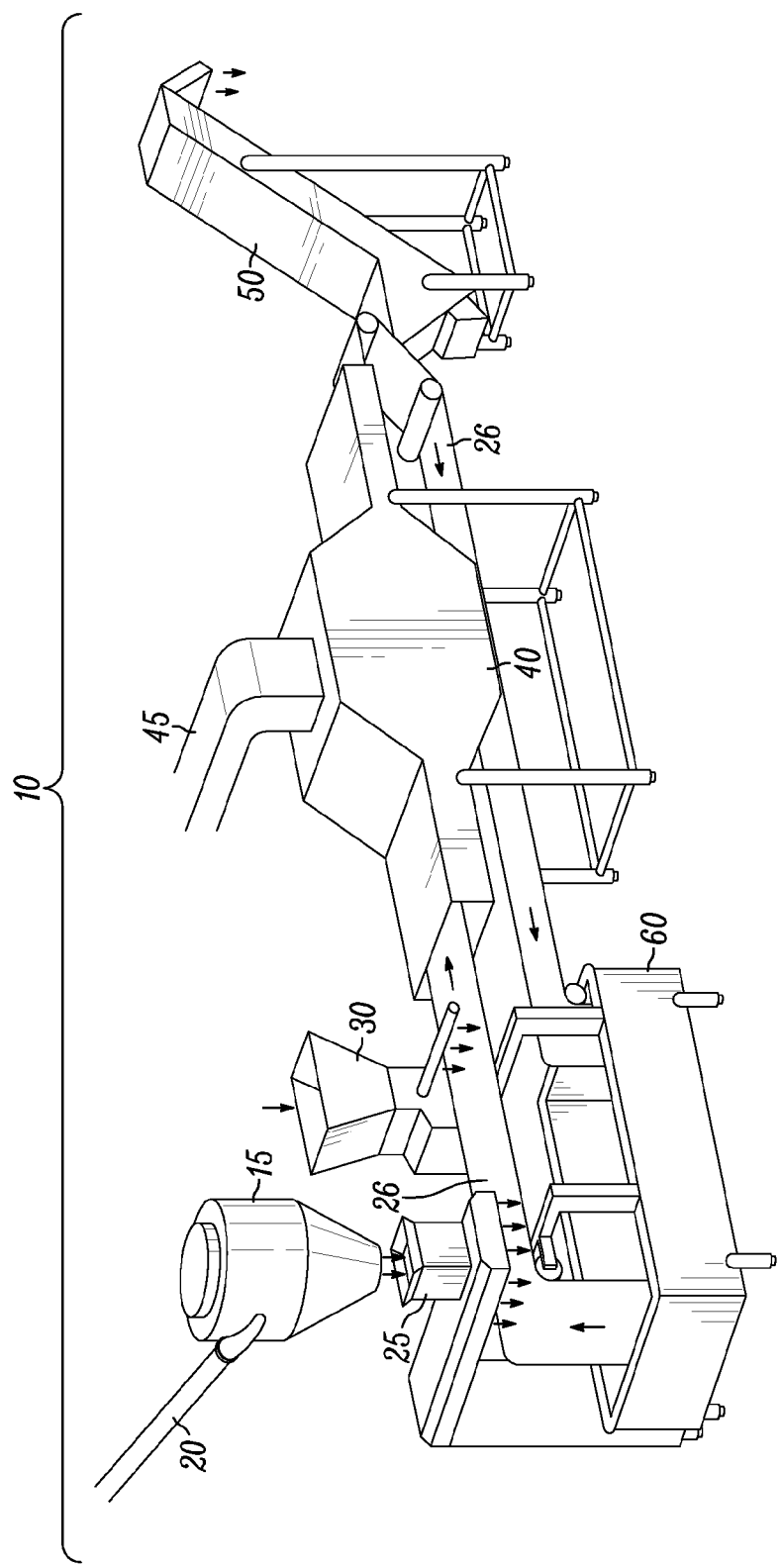
FIG. 1 is a representative depiction of a system for production of pasta filata cheese with a microwave energy source to heat the cheese curd.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, relative amounts of components in a mixture, and various temperature and other parameter ranges recited in the methods.

As used herein, "about" refers to up to plus or minus 10% of the indicated number. For example, "about 25° C." refers to 22.5° C. to 27.5° C. In some embodiments, about refers to up to plus or minus 9, 8, 7, 6, 5, 4, 3, 2, or 1% of the indicated number. When only integer values are possible, "about" refers to up to plus or minus 10% rounded to the nearest integer number. All numbers and numerical ranges recited herein are intended to include the term "about." Thus, even if the number or numerical range is not preceded by the term "about," number or numerical range are intended to cover plus or minus 10% of the indicated number. For example, a recited temperature range of "10 to 20" is intended to include "9 to 22."

As used herein, "auger stretching" refers to a continuous stretching and mixing of cheese and ingredients with low, medium, or high moisture content. The auger pitch, overlap and clearances are key to the performance and capacity of the unit.

As used herein, Clean-In-Place Section Belt Cleaning refers to the belt that will be continuously water rinsed during the production process to restrict the reheating of cheese particles that cling to the belt. In one embodiment, the cabinet or component containing the microwave energy source can be manually cleaned.

As used herein, the Clean-in-Place Cabinet Cleaning refers to the microwave cabinet that will be efficiently and automatically cleaned via a CIP wash and rinse cycle provided by a CIP system.

As used herein, a "cyclone" is an apparatus for separation of cheese curd in an airstream by the use of centrifugal forces. Cheese curd drops out of the bottom and air is evacuated out the top.

As used herein, a "curd mill" may reduce the size of the curd to a uniform size necessary for providing even heating. In one embodiment, a curd mill may be used while in other embodiments, a curd mill may not be required.

As used herein, "fluid dispensing" refers to positive displacement pump heads coupled with a stepping motor drive or other positive displacement or metering device allowing the system to have highly precise flow rates of liquids and slurry delivery.

As used herein, "heating" refers to the process of increasing the temperature of a product, including but not limited to a dairy product and cheese curd. In one embodiment, heating results in cooking the product to the final state. In another embodiment, heating results in transforming the product from a first uncooked state to a second uncooked state.

As used herein, an "ingredient dispenser" feeds dry ingredients at a precise and adjustable flow rate. The dispenser utilizes a positive driven internal auger to gently fluidize ingredients without breaking down the base composition.

As used herein, the term "input material" includes but is not limited to cheese precursor, curd precursor, cream, and cheese curd.

As used herein, the term "housing" refers an enclosed space or compartment. In one embodiment, the housing can be within a larger apparatus. The terms housing and chamber can be used interchangeably unless explicitly stated otherwise.

As used herein, the term "manipulating" refers to transforming a product from a first state to a second state. In one embodiment, manipulating includes but is not limited to shaping, molding, sizing, cutting, milling, grinding, leveling and augering a product. In yet another embodiment, manipulating includes transforming a product from a first state to a second state, wherein the second state has a more uniform shape, size, volume, density, mass or weight as compared to the first state.

As used herein, a "microwave system" refers to any device, apparatus or method for heating using microwaves. Microwave systems contemplated herein include systems that heat exclusively with the use of microwaves and systems that heat with both microwaves and other heat sources.

As used herein, "microwave energy source" refers to any device, apparatus or method for heating using microwaves including but not limited to a microwave transmitter.

As used herein, the phrase "heating profile" refers to the heating characteristics and/or dimensions of the product. The phrase "heating profile" includes but is not limited to the rate at which the product can absorb energy/heat. The phrase heating profile can include but is not limited to the thickness of the product, the volume of the product, the length, width, and height of the product, the density of the product, and the mass of the product.

As used herein, the term "product leveling apparatus" refers to one or more devices that transform a product from a first state to a second state, wherein the second state has a more uniform profile as compared to the first state. In one embodiment, the product leveling apparatus transform a product to have a uniform profile with regard to shape, size, volume, weight, density, or mass. In one embodiment, the product leveling apparatus can transform the product by any method including but not limited to cutting, milling, shaping, molding, leveling, grinding, augering, separating, or flattening the product.

As used herein, the phrase "uniform profile" refers to the homogeneity of the characteristics of a product, including but not limited to shape, size, volume, weight, density, or mass of a product. In one embodiment, a uniform profile includes but is not limited to 100% of the product having the same characteristics, 50-99% of the product having the same characteristics, 60-99% of the product having the same characteristics, 65-99% of the product having the same characteristics, 70-99% of the product having the same characteristics, 75-99% of the product having the same characteristics, 80-99% of the product having the same characteristics, 85-99% of the product having the same characteristics, and 90-99% of the product having the same characteristics. In another embodiment, a uniform profile includes but is not limited to 95-99% of the product having the same characteristics, 92-95% of the product having the same characteristics, 87-92% of the product having the characteristics, 84-87% of the product having the same characteristics, 81-84% of the product having the same characteristics, 78-81% of the product having the same characteristics, 75-78% of the product having the same characteristics, 72-75% of the product having the same characteristics, 69-72% of the product having the same characteristics, 66-69% of the product having the same characteristics, 63-66% of the product having the same characteristics, 60-63% of the product having the same characteristics, 57-60% of the product having the same characteristics, 54-57% of the product having the same characteristics, and 50-54% of the product having the same characteristics.

As used herein, the phrase "uniform heating profile" refers to the homogeneity of the heating profile of a product including but not limited to a dairy product and a cheese curd. In one embodiment, a uniform heating profile includes but is not limited to 100% of the product having the same heating profile, 50-99% of the product having the same heating profile, 60-99% of the product having the same heating profile, 65-99% of the product having the same heating profile, 70-99% of the product having the same heating profile, 75-99% of the product having the same heating profile, 80-99% of the product having the same heating profile, 85-99% of the product having the same heating profile, and 90-99% of the product having the same heating profile. In another embodiment, a uniform heating profile includes but is not limited to 95-99% of the product having the same heating profile, 92-95% of the product having the same heating profile, 87-92% of the product having the same heating profile, 84-87% of the product having the same heating profile, 81-84% of the product having the same heating profile, 78-81% of the product having the same heating profile, 75-78% of the product having the same heating profile, 72-75% of the product having the same heating profile, 69-72% of the product having the same heating profile, 66-69% of the product having the same heating profile, 63-66% of the product having the same heating profile, 60-63% of the product having the same heating profile, 57-60% of the product having the same heating profile, 54-57% of the product having the same heating profile, and 50-54% of the product having the same heating profile.

A "soft or firm/semi-hard cheese" as used herein generally includes cheeses that have a percentage moisture on a fat free basis (MFFB) of about 54% or more, by weight. The term includes firm/semi-hard cheeses that have a MFFB, for example, of about 54% to about 80%, by wt., and cheeses with a MFFB, for example, of about 58% to about 75%, by wt. The term may also include soft cheeses with a MFFB of greater than about 60%, by wt. The term encompasses a variety of well-known cheeses including, but not limited to, Colby, Havarti, Monterey Jack, provolone, Gorgonzola, Gouda, Cheshire and Muenster, which are examples of "firm/semi-hard cheeses." Also included in the term are popular "soft cheeses" such as Mozzarella, cream cheese, and cottage cheese. A variety of mozzarella cheeses are included by the term; these can be in the soft or firm/semi-hard category, or in between the two, depending upon their moisture content. Standard mozzarella, for example, is a soft cheese, part-skim mozzarella is between soft and firm/semi-hard, and low-moisture mozzarella and low-moisture part-skim mozzarella are both designated as firm/semi-hard cheeses. The term soft or firm/semi-hard as used herein includes cheeses meeting the CODEX definition of a soft or firm/semi-hard cheese. The term also includes soft or firm/semi-hard cheeses as defined by other local, regional, national or international agencies or organizations.

Cheeses within the "soft or firm/semi-hard" category as defined herein can be prepared using a variety of methods, including conventional methods, as well as by "alternative make" provisions. The term includes, for instance, cheeses made by a process in which a cheese curd is heated and kneaded to improve the stretchability or stringiness of the final cheese, provided the cheese falls within the MFFB parameters set above. This process and related processes are sometimes referred to as a pasta filata process of manufacturing. Cheeses made by this process are known under a variety of names, including mozzarella, pasta filata, provolone, Mexican style, scamorze, and pizza cheese. Cheeses made by alternative make procedures are prepared by alternative methods of making cheeses, so long as the procedure produces a cheese having the same physical and chemical properties of the type of cheese made by a specified process (e.g., a process specified by a regulatory agency) and falls within the MFFB parameters set forth above.

The "soft" and "firm/semi-hard" cheeses that are provided include standard and non-standard cheeses and cheese products having the foregoing moisture characteristics. Standard cheeses are those that satisfy the standards as set forth by a regulatory body with respect to a particular type of cheese. A non-standard cheese is one whose composition does not meet the standard. A soft or firm/semi-hard cheese can also be a processed cheese. A soft or firm/semi-hard cheese can also be ripened or unripened.

"Mozzarella" cheese has a minimum milkfat content of 45% by weight of the solids and a moisture content of more than 52% but not more than 60% by weight. "Low-moisture mozzarella" cheeses have a minimum milkfat content of 45% by weight of the solids and the moisture content is more than 45% but not more than 52% by weight. "Part-skim mozzarella" has a moisture content of more than 52% but not more than 60% by weight, and a milk fat content that is less than 45% but not less than 30% calculated on the solids basis. "Low-moisture part-skim" mozzarella has a moisture content of more than 45% but not more than 52% by weight and a milkfat content, calculated on the solids basis, of less than 45% but not less than 30%. Further details regarding these various mozzarella cheeses is provided by 21 C.F.R. §§1.33.155-133.158.

The term "cheese precursor" as used herein refers broadly to any ingredient that is used to prepare a cheese curd, mixtures of such ingredients and subsequent processed forms of the cheese curd other than the final cheese product. Examples of cheese precursors that are ingredients include, but are not limited to, unpasteurized milk (sometimes referred to in the industry as "raw milk"), the growth medium and bacteria used in the cheese making process (sometimes referred to in the industry as "starter"), and cream. Mixtures of such ingredients are also included. One specific example of such mixtures is "vat liquid," which is a term used to refer to a combination of pasteurized milk, starter and cream. The term also includes coagulum, cheese curd, and processed cheese curd, and whey.

The term "cream" means the liquid milk product high in fat separated from milk which may have been adjusted by adding thereto: milk, concentrated milk, dry whole milk, skim milk, concentrated skim milk, nonfat dry milk or other GRAS ingredients. "Whey cream" is the liquid milk product high in fat separated from whey (cheese, casein, or other), which may have been adjusted by adding thereto: whey, concentrated whey, dry whey, or other GRAS ingredients. "Pro-cream" is the liquid milk product high in fat collected as retentate from a whey filtration process such as microfiltration which may have been adjusted by adding thereto: whey, concentrated whey, dry whey, or other GRAS ingredients.

The term "curd precursor" refers to any soft or firm/semi-hard cheese ingredient, mixture or composition that exists or is formed prior to formation of the cheese curd. The term thus includes, for example, raw milk, milk powder, milk concentrate, skim milk concentrate, starter, cream, cheese vat liquids and coagulum.

The methods and apparatuses disclosed herein are directed toward pasta filata cheese. The principal varieties of pasta filata cheeses are: Caciocavallo, Provolone, Provolette, Pizza Cheese, Mozzarella, Provole, Scamorze, and Provatura. The well-known example of pasta filata-type of cheese is mozzarella. In the U.S., the standards of identity of the code of federal regulations subdivides mozzarella cheeses into: "Mozzarella", "Low Moisture Mozzarella", "Part Skim Mozzarella" and "Low Moisture Part Skim Mozzarella."

I. Methods of Making Pasta Filata Cheese with a Microwave System

In one embodiment, the disclosure relates to a method of making a pasta filata cheese by processing a traditional curd using a microwave system. The methods disclosed herein can be used to produce any of the traditional cheeses broadly described as pasta filata cheeses. The cheeses made by the methods disclosed herein will replicate the flavor, functionality and appearance of traditional cheeses of these types. The ability to achieve a cheese with the characteristics of these traditional cheeses using a microwave system provides distinct economic advantages over producing traditional mozzarella in the conventional manner.

In one embodiment, the methods disclosed herein will obtain better solids retention and increased product yield as compared to traditional methods of making pasta filata. In one embodiment, the methods disclosed herein will obtain better solids retention and increased product yield ranging from about 0.1% by weight to about 0.5% by weight as compared to traditional methods of making pasta filata. Throughout this description, all percentages are by weight, unless otherwise specified.

In one embodiment, the methods disclosed herein will obtain better solids retention and increased product yield ranging from about 0.5% by weight to about 2% by weight as compared to traditional methods of making pasta filata.

In one embodiment, the methods disclosed herein will obtain better solids retention and increased product yield ranging from about 0.75% by weight to about 3% by weight as compared to traditional methods of making pasta filata.

In one embodiment, the methods disclosed herein will obtain better solids retention and increased product yield ranging from about 1% by weight to about 4% by weight as compared to traditional methods of making pasta filata.

In one embodiment, the methods disclosed herein will increase solids retention and product yield in excess of about 0.2% by weight as compared to traditional methods of making pasta filata.

In one embodiment, the methods disclosed herein will obtain better solids retention and increased product yield in excess of about 0.5% by weight as compared to traditional methods of making pasta filata.

In one embodiment, the methods disclosed herein will obtain better solids retention and increased product yield in excess of about 1% by weight as compared to traditional methods of making pasta filata.

Not wishing to be bound by any particular theory, the methods disclosed herein increase solids retention at least in part because the material is not cooked in water and thus, there is no waste stream created.

A. Microwave Energy

In one embodiment, the disclosure relates to a method comprising heating dairy product using energy from a microwave system. In one embodiment, the disclosure relates to a method comprising heating dairy product using microwave energy. In one embodiment, the dairy product is curd. In yet another embodiment, the dairy product is cheese curd.

In one embodiment, the disclosure relates to a method of making pasta filata cheese comprising heating cheese curd using energy from a microwave system. In one embodiment, the disclosure relates to a method of making pasta filata cheese comprising heating cheese curd using microwave energy. In another embodiment, the method further comprises stretching the cooked or melted cheese curd through the use of augers.

In yet another embodiment, the disclosure relates to a method of making pasta filata cheese comprising: (a) creating a uniform shape, size, volume, and/or profile of cheese curd, and (b) heating cheese curd using microwave energy.

In one embodiment, creating a uniform shape, size, volume, and/or profile of cheese curd comprises leveling the cheese.

In still another embodiment, the disclosure relates to a method of making pasta filata cheese comprising: (a) leveling cheese curd to create a uniform heating profile, and (b) heating cheese curd using microwave energy.

In one embodiment, the microwave energy system operates from about 100 watts to about 400 kW. In yet another embodiment, the microwave energy operates from about 100 watts to about 400 kW. In still another embodiment, the microwave system is set from about 100 watts to about 400 kW.

In another embodiment, microwave system operates from 100-150, 150-200, 200-250, 250-300, 300-350, 350-400, 400-450, 450-500, 500-550, 550-600, 600-650, 650-700, 700-750, 750-800, 800-850, 850-900, 900-950, 950-1,000 watts.

In yet another embodiment, the microwave system operates from about 30 kw to about 400 kw. In yet another embodiment, the microwave system operates from about 30 kw to about 360 kw. In yet another embodiment, the microwave system operates from about 30 kw to about 330 kw. In yet another embodiment, the microwave system operates from about 30 kw to about 300 kw. In yet another embodiment, the microwave system operates from about 30 kw to about 270 kw. In yet another embodiment, the microwave system operates from about 30 kw to about 240 kw. In yet another embodiment, the microwave system operates from about 30 kw to about 210 kw. In yet another embodiment, the microwave system operates from about 30 kw to about 180 kw. In yet another embodiment, the microwave system operates from about 30 kw to about 150 kw. In yet another embodiment, the microwave system operates from about 30 kw to about 120 kw. In yet another embodiment, the microwave system operates from about 30 kw to about 90 kw. In yet another embodiment, the microwave system operates from about 30 kw to about 60 kw.

In yet another embodiment, the microwave system operates from about 60 kw to about 300 kw. In yet another embodiment, the microwave system operates from about 90 kw to about 300 kw. In yet another embodiment, the microwave system operates from about 120 kw to about 300 kw. In yet another embodiment, the microwave system operates from about 150 kw to about 300 kw. In yet another embodiment, the microwave system operates from about 180 kw to about 300 kw. In yet another embodiment, the microwave system operates from about 210 kw to about 300 kw. In yet another embodiment, the microwave system operates from about 240 kw to about 300 kw. In yet another embodiment, the microwave system operates from about 270 kw to about 300 kw.

In yet another embodiment, the microwave system operates from about 30 kw to about 300 kw, from about 40 kw to about 290 kw, from about 50 kw to about 280 kw, from about 60 kw to about 270 kw, from about 70 kw to about 260 kw, from about 80 kw to about 250 kw, from about 90 kw to about 240 kw, from about 100 kw to about 230 kw, from about 110 kw to about 220 kw, from about 120 kw to about 210 kw, from about 130 kw to about 200 kw, from about 140 kw to about 190 kw, from about 150 kw to about 180 kw, and from about 160 kw to about 170 kw.

In yet still another embodiment, microwave system operates from about 50 to about 225 kw, from about 55 to about 220 kw, from about 60 to about 215 kw, from about 65 to about 210 kw, from about 70 to about 200 kw, from about 75 to about 195 kw, from about 80 to about 190 kw, from about 85 to about 185 kw, from about 90 to about 180 kw, from about 95 to about 175 kw, from about 100 to about 170 kw, from about 105 to about 165 kw, from about 110 to about 160 kw, from about 115 to about 155 kw, from about 120 to about 150 kw, from about 125 to about 145 kw, and from about 130 to about 140 kw.

In yet still another embodiment, microwave system operates from about 50 to about 225 kw, from about 55 to about 225 kw, from about 60 to about 225 kw, from about 65 to about 225 kw, from about 70 to about 225 kw, from about 75 to about 225 kw, from about 80 to about 225 kw, from about 85 to about 225 kw, from about 90 to about 225 kw, from about 95 to about 225 kw, from about 100 to about 225 kw, from about 105 to about 225 kw, from about 110 to about 225 kw, from about 115 to about 225 kw, from about 120 to about 225 kw, from about 125 to about 225 kw, from about 130 to about 225 kw, from about 135 to about 225 kw, from about 140 to about 225 kw, from about 145 to about 225 kw, from about 150 to about 225 kw, from about 155 to about 225 kw, from about 160 to about 225 kw, from about 165 to about 225 kw, from about 170 to about 225 kw, from about 175 to about 225 kw, from about 180 to about 225 kw, from about 185 to about 225 kw, from about 190 to about 225 kw, from about 195 to about 225 kw, from about 200 to about 225 kw, from about 205 to about 225 kw, from about 210 to about 225 kw, from about 215 to about 225 kw, and from about 220 to about 225 kw.

In still another embodiment, microwave system operates from about 1-3 kw, 3-5 kw, 5-7 kw, 7-9 kw, 9-11 kw, 11-15 kw, 15-20 kw, 20-25 kw, 25-30 kw, 30-35 kw, 35-40 kw, 40-45 kw, 45-50 kw, 50-55 kw, 55-60 kw, 60-65 kw, 65-70 kw, 70-75 kw, 75-80 kw, 80-85 kw, 85-90 kw, 90-95 kw, 95-100, 100-110 kw, 110-120 kw, 120-130 kw, 130-140 kw, 140-150 kw, 150-160 kw, 160-170 kw, 170-180 kw, 180-190 kw, 190-200 kw, 200-210 kw, 210-220 kw, 220-230 kw, 230-240 kw, 240-250 kw, 250-260 kw, 260-270 kw, 270-280 kw, 280-290 kw, 290-300 kw, 300-310 kw, 310-320 kw, 320-330 kw, 330-340 kw, 340-350 kw, 350-360 kw, 360-370 kw, 370-380 kw, 380-390 kw, 390-400 kw, and greater than 400 kw.

In another embodiment, the microwave system operates at a power selected from about the group consisting of 1 kw, 2 kw, 3 kw, 4 kw, 5 kw, 6, kw, 7 kw, 8 kw, 9 kw, 10 kw, 11 kw, 12 kw, 13 kw, 14 kw, 15 kw, 16 kw, 17 kw, 18 kw, 19 kw, 20 kw, 21 kw, 22 kw, 23 kw, 24 kw, 25 kw, 26 kw, 27 kw, 28 kw, 29 kw, 30 kw, 31 kw, 32 kw, 33 kw, 34 kw, 35 kw, 36 kw, 37 kw, 38 kw, 39 kw, 40 kw, 41 kw, 42 kw, 43 kw, 44 kw, 45 kw, 46 kw, 47 kw, 48 kw, 49 kw, 50 kw, 51 kw, 52 kw, 53 kw, 54 kw, 55 kw, 56 kw, 57 kw, 58 kw, 59 kw, 60 kw, 61 kw, 62 kw, 63 kw, 64 kw, 65 kw, 66 kw, 67 kw, 68 kw, 69 kw, 70 kw, 71 kw, 72 kw, 73 kw, 74 kw, 75 kw, 76 kw, 77 kw, 78 kw, 79 kw, 80 kw, 81 kw, 82 kw, 83 kw, 84 kw, 85 kw, 86 kw, 87 kw, 88 kw, 89 kw, 90 kw, 91 kw, 92 kw, 93 kw, 94 kw, 95 kw, 96 kw, 97 kw, 98 kw, 99 kw, 100 kw, 101 kw, 102 kw, 103 kw, 104 kw, 105 kw, 106 kw, 107 kw, 108 kw, 109 kw, 110 kw, 111 kw, 112 kw, 113 kw, 114 kw, 115 kw, 116 kw, 117 kw, 118 kw, 119 kw, 120 kw, 121 kw, 122 kw, 123 kw, 124 kw, 125 kw, 126 kw, 127 kw, 128 kw, 129 kw, 130 kw, 131 kw, 132 kw, 133 kw, 134 kw, 135 kw, 136 kw, 137 kw, 138 kw, 139 kw, 140 kw, 141 kw, 142 kw, 143 kw, 144 kw, 145 kw, 146 kw, 147 kw, 148 kw, 149 kw, 150 kw, 151 kw, 152 kw, 153 kw, 154 kw, 155 kw, 156 kw, 157 kw, 158 kw, 159 kw, 160 kw, 161 kw, 162 kw, 163 kw, 164 kw, 165 kw, 166 kw, 167 kw, 168 kw, 169 kw, 170 kw, 171 kw, 172 kw, 173 kw, 174 kw, 175 kw, 176 kw, 177 kw, 178 kw, 179 kw, 180 kw, 181 kw, 182 kw, 183 kw, 184 kw, 185 kw, 186 kw, 187 kw, 188 kw, 189 kw, 190 kw, 191 kw, 192 kw, 193 kw, 194 kw, 195 kw, 196 kw, 197 kw, 198 kw, 199 kw, 200 kw, 201 kw, 202 kw, 203 kw, 204 kw, 205 kw, 206 kw, 207 kw, 208 kw, 209 kw, 210 kw, 211 kw, 212 kw, 213 kw, 214 kw, 215 kw, 216 kw, 217 kw, 218 kw, 219 kw, 220 kw, 221 kw, 222 kw, 223 kw, 224 kw, 225 kw, 226 kw, 227 kw, 228 kw, 229 kw, 230 kw, 231 kw, 232 kw, 233 kw, 234 kw, 235 kw, 236 kw, 237 kw, 238 kw, 239 kw, 240 kw, 241 kw, 242 kw, 243 kw, 244 kw, 245 kw, 246 kw, 247 kw, 248 kw, 249 kw, 250 kw, 251 kw, 252 kw, 253 kw, 254 kw, 255 kw, 256 kw, 257 kw, 258 kw, 259 kw, 260 kw, 261 kw, 262 kw, 263 kw, 264 kw, 265 kw, 266 kw, 267 kw, 268 kw, 269 kw, 270 kw, 271 kw, 272 kw, 273 kw, 274 kw, 275 kw, 276 kw, 277 kw, 278 kw, 279 kw, 280 kw, 281 kw, 282 kw, 283 kw, 284 kw, 285 kw, 286 kw, 287 kw, 288 kw, 289 kw, 290 kw, 291 kw, 292 kw, 293 kw, 294 kw, 295 kw, 296 kw, 297 kw, 298 kw, 299 kw, and 300 kw.

In one embodiment, the disclosure relates to a method of making pasta filata cheese comprising heating cheese curd using in a chamber comprising a microwave energy source. In yet another embodiment, the method comprises prior to heating, leveling the cheese curd prior to create a uniform heating profile of the cheese curd. In still another embodiment, the method further comprises stretching the cooked or melted cheese curd through the use of augers.

In one embodiment, the disclosure relates to a method for making pasta filata cheese comprising heating cheese curd with a microwave system, wherein the microwave energy operates from about 63 to about 77 kw and heats from about 5,580 to about 6,820 pounds of cheese curd per hour.

In one embodiment, the disclosure relates to a method for making pasta filata cheese comprising heating cheese curd with microwave energy, wherein the microwave energy operates at about 70 kw and heats about 6200 pounds of cheese curd per hour. In yet another embodiment, the disclosure relates to a method for making pasta filata cheese comprising heating cheese curd with microwave energy, wherein the microwave energy operates about 68 kw and heats about 6300 pounds of cheese per hour.

In one embodiment, the disclosure relates to a method for making pasta filata cheese comprising heating cheese curd with microwave energy, wherein the microwave energy operates from about 56 to about 84 kw and heats from about 5,000 to about 7,440 pounds of cheese curd per hour.

In one embodiment, the disclosure relates to a method for making pasta filata cheese comprising heating cheese curd with microwave energy, wherein the microwave energy operates from about 49 to about 91 kw and heats from about 4,340 to about 8,060 pounds of cheese curd per hour.

In one embodiment, the disclosure relates to a method for making pasta filata cheese comprising heating cheese curd with microwave energy, wherein the microwave energy operates from about 42 to about 98 kw and heats from about 3,720 to about 8,680 pounds of cheese curd per hour.

In one embodiment, the disclosure relates to a method for making pasta filata cheese comprising heating cheese curd with microwave energy, wherein the microwave energy operates from about 35 to about 105 kw and heats from about 3,100 to about 9,300 pounds of cheese curd per hour.

In yet another embodiment, the disclosure relates to a method for making pasta filata cheese comprising heating cheese curd with microwave energy, wherein the microwave energy operates from about 126 to about 154 kw and heats from about 11,160 to about 13,640 pounds of cheese curd per hour.

In yet another embodiment, the disclosure relates to a method for making pasta filata cheese comprising heating cheese curd with microwave energy, wherein the microwave energy operates from about 112 to about 168 kw and heats from about 9,920 to about 14,880 pounds of cheese curd per hour.

In yet another embodiment, the disclosure relates to a method for making pasta filata cheese comprising heating cheese curd with microwave energy, wherein the microwave energy operates from about 98 to about 182 kw and heats from about 8,680 to about 16,120 pounds of cheese curd per hour.

In yet another embodiment, the disclosure relates to a method for making pasta filata cheese comprising heating cheese curd with microwave energy, wherein the microwave energy operates from about 252 to about 308 kw and heats from about 22,320 to about 27,280 pounds of cheese curd per hour.

In yet another embodiment, the disclosure relates to a method for making pasta filata cheese comprising heating cheese curd with microwave energy, wherein the microwave energy operates from about 224 to about 336 kw and heats from about 19,840 to about 29,760 pounds of cheese curd per hour.

In yet another embodiment, the disclosure relates to a method for making pasta filata cheese comprising heating cheese curd with microwave energy, wherein the microwave energy operates from about 196 to about 364 kw and heats from about 17,360 to about 32,240 pounds of cheese curd per hour.

In yet another embodiment, the disclosure relates to a method for making pasta filata cheese comprising heating cheese curd with microwave energy, wherein the microwave energy operates from about 168 to about 392 kw and heats from about 14,880 to about 34,720 pounds of cheese curd per hour.

In yet another embodiment, the disclosure relates to a method for making pasta filata cheese comprising heating cheese curd with microwave energy, wherein the microwave energy operates from about 31.5 to about 38.5 kw and heats from about 2790 to about 3410 pounds of cheese curd per hour.

In yet another embodiment, the disclosure relates to a method for making pasta filata cheese comprising heating cheese curd with microwave energy, wherein the microwave energy operates from about 28 to about 42 kw and heats from about 2,480 to about 3,720 pounds of cheese curd per hour.

In yet another embodiment, the disclosure relates to a method for making pasta filata cheese comprising heating cheese curd with microwave energy, wherein the microwave energy operates from about 24.5 to about 45.5 kw and heats from about 2,170 to about 4,030 pounds of cheese curd per hour.

In yet another embodiment, the disclosure relates to a method for making pasta filata cheese comprising heating cheese curd with microwave energy, wherein the microwave energy operates from about 21 to about 49 kw and heats from about 1860 to about 4,340 pounds of cheese curd per hour.

In yet another embodiment, the disclosure relates to a method for making pasta filata cheese comprising heating cheese curd with microwave energy, wherein the microwave energy operates from about 56 to about 126 kw and heats from about 5,000 to about 11,160 pounds of cheese curd per hour.

In yet another embodiment, the disclosure relates to a method for making pasta filata cheese comprising heating cheese curd with microwave energy, wherein the microwave energy operates from about 56 to about 168 kw and heats from about 5,000 to about 14,880 pounds of cheese curd per hour.

In yet another embodiment, the disclosure relates to a method for making pasta filata cheese comprising heating cheese curd with microwave energy, wherein the microwave energy operates from about 56 to about 182 kw and heats from about 5,000 to about 16,120 pounds of cheese curd per hour.

In yet another embodiment, the disclosure relates to a method for making pasta filata cheese comprising heating cheese curd with microwave energy, wherein the microwave energy operates from about 56 to about 224 kw and heats from about 5,000 to about 19,840 pounds of cheese curd per hour.

In yet another embodiment, the disclosure relates to a method for making pasta filata cheese comprising heating cheese curd with microwave energy, wherein the microwave energy operates from about 56 to about 252 kw and heats from about 5,000 to about 22,320 pounds of cheese curd per hour.

In yet another embodiment, the disclosure relates to a method for making pasta filata cheese comprising heating cheese curd with microwave energy, wherein the microwave energy operates from about 56 to about 308 kw and heats from about 5,000 to about 27,280 pounds of cheese curd per hour.

In still another embodiment, the disclosure relates to a method of making pasta filata cheese comprising moving cheese curd through a chamber comprising one or more microwave energy sources, wherein the one or more microwave energy sources operates from about 63 to about 77 kw and further wherein from about 5,580 to about 6,820 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates at about 70 kw and about 6200 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates about 68 kw and about 6300 pounds of cheese per hour is moved through the chamber.

In still another embodiment, the disclosure relates to a method of making pasta filata cheese comprising moving cheese curd through a chamber comprising one or more microwave energy sources, wherein the one or more microwave energy sources from about 56 to about 84 kw and from about 5,000 to about 7,440 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources from about 49 to about 91 kw and from about 4,340 to about 8,060 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 42 to about 98 kw and from about 3,720 to about 8,680 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 35 to about 105 kw and from about 3,100 to about 9,300 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 126 to about 154 kw and from about 11,160 to about 13,640 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 112 to about 168 kw and from about 9,920 to about 14,880 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 98 to about 182 kw and from about 8,680 to about 16,120 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 252 to about 308 kw and from about 22,320 to about 27,280 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 224 to about 336 kw and from about 19,840 to about 29,760 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 196 to about 364 kw and from about 17,360 to about 32,240 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 168 to about 392 kw and from about 14,880 to about 34,720 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 31.5 to about 38.5 kw and from about 2790 to about 3410 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 28 to about 42 kw and from about 2,480 to about 3,720 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 24.5 to about 45.5 kw and from about 2,170 to about 4,030 pounds of cheese curd per hour is moved through the chamber.

In still another embodiment, the disclosure relates to a method of making pasta filata cheese comprising moving cheese curd through a chamber comprising one or more microwave energy sources, wherein the one or more microwave energy sources operates from about 21 to about 49 kw and from about 1860 to about 4,340 pounds of cheese curd per hour is moved through the chamber.

In another embodiment, the microwave energy can be applied continuously. In yet another embodiment, the microwave energy is applied in intervals including but not limited to 2, 3, 4, 5, 6, 7, 8, 9, 10, 11, 12, 13, 14, 15 and greater than 15 intervals.

In yet another embodiment, the microwave energy can be applied to the cheese curd for a period of time, followed by a resting period where no microwave energy is applied. The resting period can be any desired time period including but not limited to 5-10 s, 10-15 s, 15-20 s, 20-25 s, 25-30 s, 30-35 s, 35-40 s, 40-45 s, 45-50 s, 50-55 s, 55-60 s, 1-3 min, 3-5 min, 5-7 min, 7-9 min, 9-11 min, 11-13 min, 13-15 min, 15-17 min, 17-19 min, 19-21 min, 21-23 min, 23-25 min, 25-27 min, 27-29 min, 30 min, 30-60 min, 1-2 hours (hrs), 2-4 hrs, 4-6 hrs, 6-8 hrs, 8-10 hrs, and greater than 10 hours.

In another embodiment, there can be numerous cycles of applying microwave energy to the cheese curd followed by a resting period including but not limited to 2, 3, 4, 5, 6, 7, 8, 9, 10, 11, 12, 13, 14, 15, and greater than 15 cycles.

In yet another embodiment, the cheese curd is heated by the microwave energy for a period of time selected from the group consisting of 5-10, 10-15, 15-20, 20-25, 25-30, 30-35, 35-40, 40-45, 45-50, 50-55, 55-60, 60-65, 65-70, 70-75, 75-80, 80-85, 85-90, 90-95, 95-100, 100-110, 110-120, 120-130, 130-140, 140-150, 150-160, 160-170, 170-180, and greater than 180 seconds.

In still another embodiment, the microwave energy can be applied from a single energy source. In another embodiment, the microwave energy can be applied from more than one energy source including but not limited to 2, 3, 4, 5, 6, 7, 8, 9, 10, and greater than 10 energy sources.

In yet another embodiment, the disclosure relates to a method for making pasta filata cheese comprising heating cheese curd with microwave energy, wherein the cheese curd is exposed to energy from 0.01 kw/pound of cheese curd/min to 5 kw/pound of cheese curd/min.

In another embodiment, the disclosure relates to a method for making pasta filata cheese comprising heating cheese curd in a chamber comprising a microwave energy source, wherein the amount of energy needed to cook the cheese to the desired end product is selected from the group consisting of from about 0.3-2.0 kw/pound of cheese curd/min, from about 0.4-2.0 kw/pound of cheese curd/min, 0.5-2.0 kw/pound of cheese curd/min, 0.6-2.0 kw/pound of cheese curd/min, 0.7-2.0 kw/pound of cheese curd/min, 0.8-2.0 kw/pound of cheese curd/min, 0.9-2.0 kw/pound of cheese curd/min, 1.0-2.0 kw/pound of cheese curd/min, 1.1-2.0 kw/pound of cheese curd/min, 1.2-2.0 kw/pound of cheese curd/min, 1.3-2.0 kw/pound of cheese curd/min, 1.4-2.0 kw/pound of cheese curd/min, 1.5-2.0 kw/pound of cheese curd/min, 1.6-2.0 kw/pound of cheese curd/min, 1.7-2.0 kw/pound of cheese curd/min, 1.8-2.0 kw/pound of cheese curd/min, and 1.9-2.0 kw/pound of cheese curd/min.

In another embodiment, the disclosure relates to a method for making pasta filata cheese comprising heating cheese curd in a chamber comprising a microwave energy source, wherein the amount of energy needed to cook the cheese to the desired end product is selected from the group consisting of from about 0.3-1.9 kw/pound of cheese curd/min, from about 0.3-1.8 kw/pound of cheese curd/min, from about 0.3-1.7 kw/pound of cheese curd/min, from about 0.3-1.6 kw/pound of cheese curd/min, from about 0.3-1.5 kw/pound of cheese curd/min, from about 0.3-1.4 kw/pound of cheese curd/min, from about 0.3-1.3 kw/pound of cheese curd/min, from about 0.3-1.2 kw/pound of cheese curd/min, from about 0.3-1.1 kw/pound of cheese curd/min, from about 0.3-1.0 kw/pound of cheese curd/min, from about 0.3-0.9 kw/pound of cheese curd/min, from about 0.3-0.8 kw/pound of cheese curd/min, from about 0.3-0.7 kw/pound of cheese curd/min, from about 0.3-0.6 kw/pound of cheese curd/min, from about 0.3-0.5 kw/pound of cheese curd/min, and from about 0.3-0.4 kw/pound of cheese curd/min.

In another embodiment, the disclosure relates to a method for making pasta filata cheese comprising heating cheese curd in a chamber comprising a microwave energy source, wherein the amount of energy needed to cook the cheese to the desired end product is selected from the group consisting of: 0.01-0.1 kw/pound of cheese curd/min, 0.1-0.3 kw/pound of cheese curd/min, 0.3-0.5 kw/pound of cheese curd/min, 0.5-0.7 kw/pound of cheese curd/min, 0.7-0.9 kw/pound of cheese curd/min, 0.9-1.0 kw/pound of cheese curd/min, 1.0-1.3 kw/pound of cheese curd/min, 1.3-1.5 kw/pound of cheese curd/min, 1.5-1.7 kw/pound of cheese curd/min, 1.7-1.9 kw/pound of cheese curd/min, 1.9-2.1 kw/pound of cheese curd/min, 2.1-2.3 kw/pound of cheese curd/min, 2.3-2.5 kw/pound of cheese curd/min, 2.5-2.7 kw/pound of cheese curd/min, 2.7-2.9 kw/pound of cheese curd/min, 2.9-3.1 kw/pound of cheese curd/min, 3.1-3.3 kw/pound of cheese curd/min, 3.3-3.5 kw/pound of cheese curd/min, 3.5-3.7 kw/pound of cheese curd/min, 3.7-3.9 kw/pound of cheese curd/min, 3.9-4.1 kw/pound of cheese curd/min, 4.1-4.3 kw/pound of cheese curd/min, 4.3-4.5 kw/pound of cheese curd/min, 4.5-4.7 kw/pound of cheese curd/min, 4.7-4.9 kw/pound of cheese curd/min, 4.9-5.0 kw/pound of cheese curd/min, and greater than 5.0 kw/pound of cheese curd/min.

In another embodiment; the disclosure relates to a method for making pasta filata cheese comprising heating cheese curd in a chamber comprising a microwave energy source, wherein the amount of energy needed to cook the cheese curd to the desired end product is selected from the group consisting of: 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0 kw/pound of cheese curd/min.

There are some important features of microwave heating that will determine the final temperature and moisture distribution during microwave processing. Any study of microwave heating in moist materials must account for simultaneous heat and moisture diffusion through the material.

Not to be bound by any particular theory, microwave heating can be described by a combined heat and moisture diffusion equation that includes a volumetric heating term associated with the dissipation of microwave energy in the material:

$$\nabla^2(pM_v + nT) - \frac{\partial}{\partial t}\left\{\begin{matrix}\left[\frac{1}{\tau_v D_a}\left(1 + \frac{(1-a_v)\sigma\rho_s}{a_v}\right) - \frac{n\rho\sigma L}{pk}\right]pM_v + \\ \left[\frac{C\rho}{k}\left(1 + \frac{\omega L}{C}\right) - \frac{p(1-a_v)\omega\rho_s}{n\tau_v D_a a_v}\right]nT\end{matrix}\right\} + \frac{nq}{k} = 0 \qquad \text{Equation 1}$$

This can be expressed in a simpler form if $\Omega = pM_v + nT$:

$$\nabla^2\Omega - \frac{1}{\gamma}\frac{\partial\Omega}{\partial t} + \frac{nq}{k} = 0 \ldots \qquad \text{Equation 2}$$

The constants of association, p and n, are calculated to satisfy:

$$\frac{1}{\gamma} = \left[\frac{1}{\tau_v D_a}\left(1 + \frac{(1-a_v)\sigma\rho_s}{a_v}\right) - \frac{n\rho\sigma L}{pk}\right] = \left[\frac{C\rho}{k}\left(1 + \frac{\omega L}{C}\right) - \frac{p(1-a_v)\omega\rho_s}{n\tau_v D_a a_v}\right] \qquad \text{Equation 3}$$

Essentially, the combined heat and moisture diffusion coefficient ($\gamma$) has two independent values, implying that heating and moisture movement occurs in two independent waves. The slower wave of the coupled heat and moisture system is always slower than either the isothermal diffusion constant for moisture or the constant vapor concentration diffusion constant for heat diffusion, whichever is less, but never by more than one half. The faster wave is always many times faster than either of these independent diffusion constants.

The fast heat and moisture diffusion wave has a profound effect on biological materials during microwave heating. In particular, very rapid heat and moisture diffusion during microwave heating yields: faster heating compared to conventional heating; and localized steam explosions that may rupture biological material.

Other important phenomena associated with microwave heating include: non-uniform heat and moisture distribution due to the geometry of the microwave applicator and the geometry of the heated material; and phenomenon such as thermal runaway, which manifest itself as localized "hot spots," and very rapid rises in temperature. The volumetric heating term (q) in equation (1) is strongly influenced by the geometry of the heated material. The equation for electromagnetic power distribution generated in a slab of thickness (W) can be described by:

$$q = \tfrac{1}{2}\omega\epsilon_0\kappa''(\tau E)^2\{e^{-2\beta z} + \Gamma^2 e^{-2\beta(W-z)} + 2\Gamma e^{-\beta(W-2z)}\cos(\delta + 2\alpha z)\} \qquad \text{Equation 4}$$

Using this volumetric heating relationship, the solution for equation (1) is:

$$\ldots \Omega(t) = \frac{n\omega\epsilon_0\kappa''(\tau E)^2}{8k\beta^2}\{e^{4\gamma\beta^2} - 1\} \qquad \text{Equation 5}$$

$$\left\{e^{-2\beta z} + \left(\frac{h}{k} + 2\beta\right)ze^{\frac{-z^2}{4\gamma t}}\right\}(1 + \Gamma^2 e^{-2\beta W})$$

From this it can be deduced that the temperature/moisture profiles in thick slabs and rectangular blocks usually result in subsurface heating where the maximum temperature is slightly below the material surface.

The microwave's electric field distribution in the radial dimension of a cylinder can be described by:

$$|E = \tau E_0 \frac{I_0(\beta r)}{I_0(\beta r_0)} \qquad \text{Equation 6}$$

The resulting solution to equation (1) can ultimately be derived:

$$\Omega(t)\frac{n\omega\epsilon_0\kappa''\tau^2 E_0^2(e^{4\beta^2\gamma t} - 1)}{4k\beta^2 I_0(2\beta r_0)}\left[\frac{4\alpha\gamma t}{[J_0(\alpha r_0)I_0(\beta r_0)]^2}e^{\frac{-r^2}{4\gamma t}} + I_0(2\beta r) + \left\{2\beta I_1(2\beta r_0) + \frac{h}{k}I_0(2\beta r_0)\right\}(r_o - r)e^{\frac{-(r_o-r)^2}{4\gamma t}}\right] \qquad \text{Equation 7}$$

The temperature/moisture profiles in small-diameter cylinders, usually exhibit pronounced core heating. On the other hand, temperature profiles in large cylinders exhibit subsurface heating, with the peak temperature occurring slightly below the surface.

$$E = \tau E_o \frac{j_o(fr)}{j_o(fr_o)} \qquad \text{Equation 8}$$

The resulting solution to equation (2) can ultimately be derived:

$$\Omega(t) = \frac{n\omega\epsilon_0\kappa''\tau^2 E_o^2(e^{4\beta^2\gamma t} - 1)}{k\beta \cdot i_o(2\beta r_o)}\left[\frac{\alpha\gamma t}{[j_o(\alpha r_o)i_o(\beta r_o)]^2}e^{\frac{-r^2}{4\gamma y}} + \frac{i_o(2\beta r)}{4\beta} + \left\{2\beta \cdot i_1(2\beta r_o) + \frac{h}{k}i_o(2\beta r_o)\right\}\frac{(r_o - r)}{4\beta}e^{\frac{-(r_o-r)^2}{4\gamma t}}\right] \qquad \text{Equation 9}$$

This analysis can aid in understanding how microwave heating affects biological and food products.

B. Product Leveling

In one embodiment, the disclosure relates to a method comprising (a) creating a uniform heating profile for a dairy product and (b) heating the dairy product of step (a) using microwave energy. In one embodiment, the dairy product is cheese curd.

In one embodiment, the disclosure relates to a method comprising (a) creating a uniform heating profile for a dairy product; (b) using one or more sensor to determine if the dairy product has a uniform heating profile; and (c) heating the dairy product using microwave energy. In one embodiment, the dairy product is cheese curd.

In one embodiment, the disclosure relates to a method comprising (a) creating a uniform shape, size or volume of a dairy product; (b) using one or more sensor to determine if the dairy product has a uniform heating profile, and (c) heating the dairy product using microwave energy. In one embodiment, the dairy product is cheese curd.

In one embodiment, the disclosure relates to a method comprising (a) manipulating a dairy product to a desired shape, size or volume; (b) using one or more sensor to determine if the dairy product has a uniform heating profile, and (c) heating the dairy product using microwave energy. In one embodiment, the dairy product is cheese curd.

In one embodiment, the disclosure relates to a method comprising leveling dairy product to create a uniform heating profile; and heating leveled dairy product using microwave energy. In one embodiment, the dairy product is cheese curd.

In yet another embodiment, the disclosure relates to a method comprising leveling cheese curd to create a uniform heating profile; and heating the cheese curd using microwave energy.

In one embodiment, leveling the dairy product or cheese curd comprises using an auger. In yet another embodiment, leveling the dairy product or cheese curd comprises using an auger with a combination of flights and paddles to distribute the dairy product or cheese curd across the width of a platform. In one embodiment, the platform is a conveyor belt.

In one embodiment, the disclosure relates to a method comprising leveling dairy product; using one or more sensors to determine if the dairy product has a uniform heating profile, and heating the dairy product using microwave energy. In one embodiment, the dairy product is cheese curd.

In one embodiment, the disclosure relates to a method comprising (a) leveling dairy product to a desired shape, size or volume; (b) using one or more sensors to determine if the dairy product of step (a) has a uniform heating profile, and (c) heating the dairy product using microwave energy. In one embodiment, the dairy product is cheese curd.

In yet another embodiment, the disclosure relates to a method comprising leveling cheese curd to create a uniform heating profile; using one or more sensors to determine if the dairy product has a uniform heating profile; and heating the cheese curd using microwave energy. In one embodiment, the sensor is a 3D sensor.

C. Conveying Material

In one embodiment, the disclosure relates to a method for producing pasta filata cheese comprising transporting cheese curd on a conveyance system to a microwave system, and heating cheese curd using energy from the microwave system.

In another embodiment, the disclosure relates to a method for producing pasta filata cheese comprising transporting cheese curd on a belt system to a microwave system, and heating cheese curd using energy from the microwave system. In another embodiment, the method further comprises stretching the cooked or melted cheese curd through the use of augers.

In yet another embodiment, the disclosure relates to a method for producing pasta filata cheese comprising (a) conveying cheese curd to a cyclone; (b) transporting cheese curd from the cyclone to a microwave system; and (c) heating cheese curd from step (a) using energy from the microwave system. In another embodiment, the method further comprises (d) stretching the heated cheese curd through the use of augers. In one embodiment, the cheese curd is transported from the cyclone to the microwave system with a conveyance system. In one embodiment, the conveyance system is a mechanical belt system.

In another embodiment, the disclosure relates to a method for producing pasta filata cheese comprising (a) air conveying cheese curd to a cyclone; (b) dispensing dry ingredients into the cheese curd after delivery to the cyclone, and (c) heating cheese curd from step (b) using energy from a microwave system. In another embodiment, the method further comprises (d) stretching the cooked or melted cheese curd through the use of augers or pumps. In another embodiment, the method further comprises transporting the cheese curd from cyclone to the microwave system using a belt system.

In another embodiment, the disclosure relates to a method for producing pasta filata cheese comprising (a) air conveying cheese curd to a cyclone, (b) milling cheese curd from the cyclone; (c) dispensing dry ingredients into the cheese curd after milling, and (d) heating the cheese curd from step (c) using energy from a microwave system. In another embodiment, the method further comprises (e) stretching the cooked or melted cheese curd through the use of augers. In still another embodiment, the cheese curd is transported using a mechanical belt system.

In still another embodiment, belt system is set at a rate selected from the group consisting of: 0.001-5 in/min, 5-10 in/min, 10-15 in/min, 15-20 in/min, 20-25 in/min, 25-30 in/min, 30-35 in/min, 35-40 in/min, 40-45 in/min, 45-50 in/min, 50-55 in/min, 55-60 in/min, 60-65 in/min, 65-70 in/min, 70-75 in/min, 75-80 in/min, 80-85 in/min, 85-90 in/min, 90-95 in/min, 95-100 in/min, 100-120 in/min, 120-140 in/min. 140-160 in/min, 160-180 in/min. 180-200 in/min, 200-220 in/min, 230-240 in/min. 240-260 in/min, 260-280 in/min, 280-300 in/min, 300-310, in/min. 310-320 in/min, 320-330 in/min, 330-340 in/min, 340-350 in/min, 350-360 in/min, and greater than 360 in/min.

In still another embodiment, belt system is set at a rate selected from the group consisting of: 5-350 in/min, 5-300 in/min, 5-250 in/min, 5-200 in/min, 5-150 in/min, 5-100 in/min, and 5-50 in/min.

In still another embodiment, belt system is set at a rate selected from the group consisting of: 25-350 in/min, 50-350 in/min, 100-350 in/min, 150-350 in/min, 200-350 in/min, 250-3500 in/min, and 300-350 in/min.

In still another embodiment, belt system is set at a rate selected from the group consisting of: 50-250 in/min, 50-200 in/min, 50-150 in/min, and 50-100 in/min.

In still another embodiment, belt system is set at a rate selected from the group consisting of: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 in/min.

In yet another embodiment, the belt width is selected from the group consisting of: from about 6 to about 96 inches, from about 6 to about 84 inches, from about 6 to about 72 inches, from about 6 to about 60 inches, from about 6 to about 48 inches, from about 6 to about 36 inches, from about 6 to about 24 inches, and from about 6 to about 12 inches.

In yet another embodiment, the belt width is selected from the group consisting of: from about 6 to about 96 inches, from about 12 to about 96 inches, from about 24 to about 96 inches, from about 36 to about 96 inches, from about 48 to about 96 inches, from about 60 to about 96 inches, from about 72 to about 96 inches, and from about 84 to about 96 inches.

In yet another embodiment, the belt width is selected from the group consisting of: from about 6 to about 9 inches, from about 9 to about 12 inches, from about 12 to about 15 inches, from about 15 to about 18 inches, from about 18 to about 21 inches, from about 21 to about 24 inches, from about 24 to about 27 inches, from about 27 to about 30 inches, from about 30 to about 33 inches, from about 33 to about 36 inches, from about 36 to about 39 inches, from about 39 to about 42 inches, from about 42 to about 45 inches, from about 45 to about 48 inches, from about 48 to about 51 inches, from about 51 to about 54 inches, from about 54 to about 57 inches, from about 57 to about 60 inches, from about 60 to about 63 inches, from about 63 to about 66 inches, from about 66 to about 69 inches, and from about 69 to about 72 inches.

D. Chamber Containing a Microwave Energy Source

In another embodiment, the cheese curd remains in the chamber for a period of time selected from the group consisting of 5-2400 seconds, 5-2000 seconds, 5-1600 seconds, 5-1200 seconds, 5-800 seconds, 5-400 seconds, 5-300 seconds, 5-200 seconds, 5-100 seconds, 5-50 seconds, and 5-25 seconds.

In another embodiment, the cheese curd remains in the chamber for a period of time selected from the group consisting of 100-2400 seconds, 100-2000 seconds, 100-1600 seconds, 100-1200 seconds, 100-800 seconds, 100-400 seconds, 100-300 seconds, 100-200 seconds, 100-150 seconds, and 100-125 seconds.

In another embodiment, the cheese curd remains in the chamber for a period of time selected from the group consisting of 10-300 seconds, 10-270 seconds, 10-240 seconds, 10-210 seconds, 10-180 seconds, 10-150 seconds, 10-120 seconds, 10-90 seconds, 10-60 seconds, and 10-30 seconds.

In another embodiment, the cheese curd remains in the chamber for a period of time selected from the group consisting of 30-300 seconds, 60-300 seconds, 90-300 seconds, 120-300 seconds, 150-300 seconds, 180-300 seconds, 210-300 seconds, 240-300 seconds, and 270-300 seconds.

In one embodiment, the disclosure relate to a method for making pasta filata cheese comprising heating cheese curd in a chamber containing a microwave energy source.

In another embodiment, the cheese curd remains in the chamber for a period of time selected from the group consisting of 5-10, 10-15, 15-20, 20-25, 25-30, 30-35, 35-40, 40-45, 45-50, 50-55, 55-60, 60-65, 65-70, 70-75, 75-80, 80-85, 85-90, 90-95, 95-100, 100-110, 110-120, 120-130, 130-140, 140-150, 150-160, 160-170, 170-180, and greater than 180 seconds.

In another embodiment, the cheese curd remains in the chamber for a period of time selected from the group consisting of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, and 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 210, 121, 122, 123, 124, 125, 126, 127, 128, 129, 130, 131, 132, 133, 134, 135, 136, 137, 138, 139, 140, 141, 142, 143, 144, 145, 146, 147,148, 149, 150, 151, 152, 153, 154, 155, 156, 157, 158, 59, 160, 161, 162, 163, 164, 165, 166, 167, 168, 169, 170, 171, 172, 173, 174, 175, 176, 177, 178, 179, and 180 seconds.

In another embodiment, the cheese curd remains in the chamber, wherein the chamber is about 48 inches in length, and the cheese curd moves through the chamber on a belt about 24 inches wide, for a period of time from about 10 to about 300 seconds.

In another embodiment, the cheese curd remains in the chamber, wherein the chamber is about 48 inches in length and the cheese curd is moved through the chamber on a belt about 24 inches wide, for a period of time selected from the group consisting of from about 10 to about 40 seconds, from about 10 to about 50 seconds, from about 10 to about 60 seconds, from about 10 to about 70 seconds, from about 10 to about 80 seconds, from about 10 to about 90 seconds, from about 10 to about 100 seconds, from about 10 to about 125 seconds, and from about 10 to about 150 seconds, from about 10 to about 200 seconds, and from about 10 to about 250 seconds.

In another embodiment, the cheese curd remains in the chamber, wherein the chamber is about 48 inches in length, and the cheese curd moves through the chamber on a belt about 48 inches wide, for a period of time from about 30 to about 650 seconds.

In another embodiment, the cheese curd remains in the chamber, wherein the chamber is about 48 inches in length and the cheese curd is moved through the chamber on a belt about 48 inches wide, for a period of time selected from the group consisting of from about 30 to about 60 seconds, from about 30 to about 90 seconds, from about 30 to about 100 seconds, from about 30 to about 120 seconds, from about 30 to about 150 seconds, from about 30 to about 180 seconds, from about 30 to about 210 seconds, from about 30 to about 240 seconds, from about 30 to about 270 seconds, and from about 30 to about 300 seconds, from about 30 to about 350 seconds, from about 30 to about 400 seconds, from about 30 to about 450 seconds, from about 30 to about 500 seconds, from about 30 to about 550 seconds, and from about 30 to about 600 seconds.

In another embodiment, the cheese curd remains in the chamber, wherein the chamber is about 96 inches in length, and the cheese curd moves through the chamber on a belt about 48 inches wide, for a period of time from about 60 to about 1400 seconds.

In another embodiment, the cheese curd remains in the chamber, wherein the chamber is about 96 inches in length and the cheese curd is moved through the chamber on a belt about 48 inches wide, for a period of time selected from the group consisting of from about 60 to about 90 seconds, from about 60 to about 100 seconds, from about 60 to about 120 seconds, from about 60 to about 140 seconds, from about 60 to about 150 seconds, from about 60 to about 180 seconds, from about 60 to about 210 seconds, from about 60 to about 240 seconds, from about 60 to about 270 seconds, and from about 60 to about 300 seconds, from about 60 to about 350 seconds, from about 60 to about 400 seconds, from about 60 to about 450 seconds, from about 60 to about 500 seconds, from about 60 to about 550 seconds, from about 60 to about 600 seconds, from about 60 to about 700 seconds, from about 60 to about 800 seconds, from about 60 to about 900 seconds, from about 60 to about 1000 seconds, from about 60 to about 1200 seconds, and from about 60 to about 1400 seconds.

In one embodiment, the chamber containing the microwave energy source can be from about 6 to about 12 inches in length, from about 12 inches to about 18 inches length, from about 18 to about 24 inches length, from about 24 to about 30 inches length, from about 30 inches to about 36 inches length, from about 36 inches to about 42 inches length, from about 42 inches to about 48 inches length, from about 48 inches to about 54 inches length, from about 54 inches to about 60 inches length, from about 60 inches to about 66 inches length, from about 66 inches to about 72 inches length, from about 72 inches to about 78 inches length, from about 78 inches to 84 inches length, from about 84 inches to about 90 inches length, from about 90 inches to about 96 inches length, from about 96 inches to about 102 inches length, from about 102 inches to about 108 inches length, from about 108 inches to about 114 inches length, from about 114 inches to about 120 inches length, and greater than 120 inches length.

In one embodiment, the chamber containing the microwave energy source can be from about 12 to about 192 inches in length, from about 24 to about 192 inches in length, from about 36 to about 192 inches in length, from about 48 to about 192 inches in length, from about 60 to about 192 inches in length, from about 72 to about 192 inches in length, from about 84 to about 192 inches in length, from about 96 to about to about 192 inches in length, from about 108 to about to about 192 inches in length, from about 120 to about to about 192 inches in length, from about 132 to about 192 inches in length, from about 144 to about 192 inches in length, from about 156 to about 192 inches in length, from about 168 to about 192 inches in length, and from about 180 to about 192 inches in length.

In yet another embodiment, the chamber containing the microwave energy source can be from 48 to about 192 inches in length. In yet another embodiment, the chamber containing the microwave energy source can be from 48 to about 144 inches in length. In yet another embodiment, the chamber containing the microwave energy source can be from 48 to about 96 inches in length.

In still another embodiment, the chamber containing the microwave energy source can hold from about 25 to about 500 pound of cheese curd, from about 25 to about 400 pounds of cheese curd, from about 25 to about 300 pounds of cheese curd, from about 25 to about 250 pounds of cheese curd, from about 25 to about 200 pounds of cheese curd, from about 25 to about 150 pounds of cheese curd, from about 25 to about 125 pounds of cheese curd, from about 25 to about 100 pounds of cheese curd, from about 25 to about 75 pounds of cheese curd, and from about 25 to about 50 pounds of cheese curd. With reference to the amount of cheese curd held in the chamber, the amounts in the chamber reflect an amount that allows adequate heating and provides for a desired end product.

In still another embodiment, the chamber containing the microwave energy source can hold from about 50 to about 500 pound of cheese curd, from about 50 to about 400 pounds of cheese curd, from about 50 to about 300 pounds of cheese curd, from about 50 to about 250 pounds of cheese curd, from about 50 to about 200 pounds of cheese curd, from about 50 to about 150 pounds of cheese curd, from about 50 to about 125 pounds of cheese curd, from about 50 to about 100 pounds of cheese curd, and from about 50 to about 75 pounds of cheese curd.

In one embodiment, the chamber containing the microwave energy source can be 48 inches in length and can hold an amount of curd selected from the group consisting of from about 50 pounds of curd to about 100 pounds of curd, from about 50 pounds of curd to about 150 pounds of curd, and from about 50 pounds of curd to about 200 pounds of curd.

In one embodiment, the chamber containing the microwave energy source can be from about 48 inches to about 96 inches in length and can hold from about 50 pounds of curd to about 250 pounds of curd.

In yet another embodiment, the chamber can be designed to contain a single microwave energy source or more than one microwave energy source. In still another embodiment, the chamber can contain 1, 2, 3, 4, 5, 6, 7, 8, 9, 10, 11, 12, 13, 14, and 15 microwave energy sources. In one embodiment, the microwave energy sources can deliver the same amount of energy.

In another embodiment, the microwave energy sources are set to deliver different amounts of energy. In one embodiment, the chamber comprises a first microwave energy source and a second microwave energy source. The amount of energy delivered from the first microwave energy source can be greater than the amount of energy delivered from the second microwave energy source and be from 0.01% to 0.01%, from 0.1% to 0.3%, from 0.3% to 0.5%, from 0.5% to 0.7%, from 0.7% to 0.9%, from 0.9% to 1.0%, from 1.0% to 1.5%, from 1.5% to 2%, from 2% to 2.5%, from 2.5% to 3%, from 3% to 3.5%, from 3.5% to 4%, from 4% to 4.5%, from 4.5% to 5%, from 5% to 10%, from 10% to 20%, and greater than 20% of the energy delivered from the second microwave energy source.

In another embodiment, the amount of energy delivered from the second microwave energy source can be greater than the amount of energy delivered from the first microwave energy source and be from 0.01% to 0.01%, from 0.1% to 0.3%, from 0.3% to 0.5%, from 0.5% to 0.7%, from 0.7% to 0.9%, from 0.9% to 1.0%, from 1.0% to 1.5%, from 1.5% to 2%, from 2% to 2.5%, from 2.5% to 3%, from 3% to 3.5%, from 3.5% to 4%, from 4% to 4.5%, from 4.5% to 5%, from 5% to 10%, from 10% to 20%, and greater than 20% of the energy delivered from the first microwave energy source.

E. Mass Density of the Cheese Curd

In another embodiment, methods disclosed herein can use cheese curds having any mass density commensurate with the microwave energy source and the size of the microwave chamber.

In one embodiment, the mass density of the cheese curd is selected from the group consisting of: from about 10 cubic inches per pound to about 40 cubic inches per pound, from about 15 cubic inches per pound to about 35 cubic inches per pound, from about 20 cubic inches per pound to about 30 cubic inches per pound, from about from about 21 cubic inches per pound to about 29 cubic inches per pound, from about 22 cubic inches per pound to about 28 cubic inches per pound, from about 23 cubic inches per pound to about 27 cubic inches per pound, and from about 24 cubic inches per pound to about 26 cubic inches per pound.

In yet another embodiment, the mass density of the cheese curd is from about 22 cubic inches per pound to about 30 cubic inches per pound. In still another embodiment, the mass density of the cheese curd is from about 26 cubic inches per pound to about 28 cubic inches per pound. In another embodiment, the mass density of the cheese curd is about 26.5 cubic inches per pound.

F. Temperature of the Cheese Curd

In another embodiment, methods disclosed herein can use cheese curd of any temperature. In one embodiment, the cheese curd can be frozen, refrigerated, room temperature, or any temperature above room temperature.

In one embodiment, the temperature of the cheese curd prior to entering the microwave system is selected from the group consisting of: 70-120° C., 75-105° C., 80-100° C., and 85-95° C.

In one embodiment, the temperature of the cheese curd prior to entering the microwave system is selected from the group consisting of: 70-75° C., 75-80° C., 80-85° C., 85-90° C., 90-95° C., 95-100° C., 100-105° C., 105-110° C., and 110-120° C.

In yet another embodiment, the temperature of the cheese curd prior to entering the microwave system is selected from the group consisting of: 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, and 110° C.

In still another embodiment, the temperature of the cheese curd after exiting the microwave system is selected from the group consisting of: 110-180° C., 115-175° C., 120-170° C., 125-165° C., 130-160° C., 135-155° C., and 140-150° C.

In yet another embodiment, the temperature of the cheese curd after exiting the microwave system is selected from the group consisting of: 110-115° C., 115-120° C., 120-125° C., 125-130° C., 130-135° C., 135-137° C., 137-139° C., 139-141° C., 141-143° C., 143-145° C., 145-150° C., 150-155° C., 155-160° C., 160-170° C., and 170-180° C.

In still another embodiment, the temperature of the cheese curd after exiting the microwave system is selected from the group consisting of: 110, 111, 112, 113, 114, 115, 116, 117, 118, 119, 210, 121, 122, 123, 124, 125, 126, 127, 128, 129, 130, 131, 132, 133, 134, 135, 136, 137, 138, 139, 140, 141, 142, 143, 144, 145, 146, 147,148, 149, 150, 151, 152, 153, 154, 155, 156, 157, 158, 59, 160, 161, 162, 163, 164, 165, 166, 167, 168, 169, 170, 171, 172, 173, 174, 175, 176, 177, 178, 179, and 180° C.

Mozzarella produced in the traditional process cooks in water that reaches temperatures of from about 145° to about 180° C. The cheese itself attains internal temperatures ranging from about 125° to about 140° C. The methods disclosed herein using energy from a microwave system produces cheese internal temperatures ranging from about 125° to about 140° C. Higher temperatures may result in longer shelf life of the final cheese.

In another embodiment, the methods disclosed herein comprising heating cheese curds with microwave energy and raising the temperature of the cheese curds (the difference between the temperature of the cheese curd exiting the microwave system and the temperature of the cheese curd entering the microwave system) from about 5 to about 50° C., from about 10 to about 45° C., from about 15 to about 40° C., from about 20 to about 35° C., and from about 25 to about 30° C.

In another embodiment, the methods disclosed herein comprising heating cheese curds with microwave energy can raise the temperature of the cheese curds from about 5 to about 60° C., from about 10 to about 60° C., from about 15 to about 60° C., from about 20 to about 60° C., from about 25 to about 60° C., from about 30 to about 60° C., from about 35 to about 60° C., from about 40 to about 60° C., and from about 45 to about 60° C.

In another embodiment, the methods disclosed herein comprising heating cheese curds with microwave energy can raise the temperature of the cheese curds from about 5 to about 55° C., from about 5 to about 50° C. from about 5 to about 45° C., from about 5 to about 40° C., from about 5 to about 35° C., from about 5 to about 30° C., from about 5 to about 25° C., from about 5 to about 20° C., from about 5 to about 15° C., and from about 5 to about 10° C.

In another embodiment, the methods disclosed herein comprising heating cheese curds with microwave energy and raising the temperature of the cheese curds by 5-10° C., 10-15° C., 15-20° C., 20-25° C., 25-30° C., 30-35° C., 35-40° C., 40-45° C., 45-50° C., 50-55° C., 55-60° C., 60-65° C., 65-70° C., 70-75° C., 75-80° C., 80-85° C., 85-90° C., 90-95° C., 95-100° C., 100-105° C., 105-110° C., and 110-115° C.

In another embodiment, the methods disclosed herein can raise the temperature of the cheese curds using microwave energy by 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C., 100° C., 101° C., 102° C., 103° C., 104° C., 105° C., 106° C., 107° C., 108° C., 109° C., 110° C., 111° C., 112° C., 113° C., 114° C., and 115° C.

G. pH of the Cheese Curd

In still another embodiment, the pH of the cheese curd prior to entering the microwave system is selected from the group consisting of: 4.8-7.0, 4.9-6.9, 5.0-6.8, 5.1-6.7, 5.2-6.6, 5.3-6.5, 5.4-6.4, 5.5-6.3, 5.6-6.2, 5.7-6.1, and 5.8-6.0.

In still another embodiment, the pH of the cheese curd prior to entering the microwave system is selected from the group consisting of: 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, and greater than 7.0.

In one embodiment, the pH of the cheese curd prior to entering the microwave system is about 5.1-5.5. In still yet another embodiment, the pH of the cheese curd prior to entering the microwave system is about 5.2.

In yet another embodiment, the pH of the cheese curd after exiting the microwave system is selected from the group consisting of: 4.1-6.0, 4.2-5.9, 4.3-5.8, 4.4-5.7, 4.5-5.6, 4.6-5.5, 4.7-5.4, 4.8-5.3, 4.9-5.2, and 5.0-5.1.

In yet another embodiment, the pH of the cheese curd after exiting the microwave system is selected from the group consisting of: 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, and greater than 6.0.

H. Input Material

Generally, the methods disclosed herein may use with any input material including any type of curd (e.g., curd used in the preparation of a pasta filata cheese). A traditional low-moisture part-skim pasta filata cheese, such as a traditional low-moisture part-skim mozzarella, typically has a target moisture content between about 47% to about 52%, a fat content (on a dry basis) between about 38% to about 42%, a pH about 5.1 to about 5.4, and a salt content between about 1.4% to about 1.9%.

A traditional whole milk pasta filata cheese, such as a traditional whole milk mozzarella cheese, has a target moisture content between about 45% to about 48%, a fat content (on a dry basis) between about 45% to about 48%, a pH about 5.1 to about 5.4, and a salt content between about 1.4% to about 1.9%. If the curd used in the methods disclosed herein for making a low-moisture part-skim mozzarella or a traditional whole milk pasta filata cheese does not have the parameters to produce a cheese within these ranges, various ingredients, well known to the cheese making art, may be added to adjust the curd to within the desired levels.

In another embodiment, the methods disclosed herein can be used with a Type I mozzarella, which contains more than 52% but not more than 60% moisture and not less than 45% milk fat on a dry basis. Salt content is per customer demand but may range from 0.5% to 2% salt.

In another embodiment, the methods disclosed herein can be used with a Type II mozzarella (low-moisture mozzarella), which contains more than 45% but not more than 52% moisture and not less than 45% milk fat on a dry basis.

In another embodiment, the methods disclosed herein can be used with a Type III mozzarella (part-skim mozzarella), which contains more than 52% but not more than 60% moisture and less than 45% but not less than 30% milk fat on a dry basis.

In another embodiment, the methods disclosed herein can be used with a low moisture part skim mozzarella. A low moisture part skim mozzarellas is defined by the USDA as "type IV" and shall contain more than 45% but less than 52% moisture, and less than 45% but not less than 30% milk fat on the dry basis. Salt content is per customer demand but may range from 0.5% to 2% salt.

In another embodiment, the methods disclosed herein can be used with a lite mozzarella cheese, which contains not less than 52% and not more than 60% moisture and not less than 10.8% milk fat on a dry basis.

The methods disclosed herein prepare mozzarella and other pasta filata cheeses that retain the characteristics of the USDA specification for Type I mozzarella, Type II low moisture mozzarella, Type III part skim mozzarella, Type IV low moisture, part skim mozzarella, and lite mozzarella as well as other pasta filata cheeses. The cheeses made by this method include soft (fresh) cheeses, such as mozzarella, and semi-hard cheeses, such as provolone.

The methods disclosed herein may use either a fresh curd or a curd that has aged or cured for up to about two weeks. It is advantageous to use fresh curd, because fresh curd eliminates the step of packaging the intermediate cheese product, before introducing the cheese into the microwave system. Then, only a single packaging step of the final processed mozzarella is necessary.

Some fat may be removed from the liquid milk before making the curd to lower the fat content. Fat may also be removed, or the fat content lowered, by adding non-fat milk solids to the curd during cheese manufacture. However, it may be less expensive to lower the fat content by adding non-fat milk solids, than by removing fat from the milk. Acceptable curd for purposes of the methods disclosed herein has a fat content of about 38% to 48% (dry basis), a moisture content of about 38% to about 48% and a salt level of about 0.8% to about 2.0% when entering the microwave system.

In one embodiment, the methods disclosed herein have obtained suitable results with a curd that has a fat content of about 42% (dry basis), a moisture content of about 43% to about 44% and a determined salt level between 0% to about 1.8% when entering the microwave system.

The desired salt content of the pasta filata cheese, such as mozzarella, made by the methods disclosed herein preferably should equal the salt content of the traditional pasta filata cheese. This is necessary in order for the final cheese to obtain characteristics of taste, body and shelf life equivalent to those of a traditional pasta filata cheese. Salt may be added at various stages of the methods, including but not limited to addition in the whey draining equipment, grinding the curd, mixing with the curd en route to the cyclone, and adding ingredients with an ingredient dispenser. Generally, if the curd entering the cheese grinder has a salt content similar to the level desired for the final cheese, salt need not be added to the curd in the cooker.

In one embodiment, salt may be added prior to molding or brining. This offers certain advantages such as incorporating salt throughout the cheese block, decreasing yield loss in brine, and providing more uniformity in the product.

In the preparation of traditional pasta filata, the curd melts in a cooker using hot water. The method disclosed herein uses energy from a microwave system to cook and/or melt the curd. The use of energy from a microwave system to cook and/or melt the curd has several advantages over traditional preparations of pasta filata cheese. Solids loss is avoided or minimized with the inventive method using energy from a microwave system. In the traditional pasta filata preparation, fats and other milk solids are lost in the water used to melt the curd. This loss can amount to from about 0.5% to about 2%. In traditional mozzarella preparation, the product from the cooker goes directly to an extruder (sometimes referred to as a molder), where the melted curd is augered into molds. The product cools in the mold so that it will retain the mold shape when the molded product is pushed out of the mold into salt brine. While the molded cheese product finishes cooling in the brine, salt from the brine soaks into the molded cheese product before packaging.

The pasta filata cheese prepared according to the methods disclosed herein has body, meltability, stretchability and flavor characteristics of a traditional pasta filata cheese. With regard to mozzarella cheese, the body of mozzarella refers to its appearance upon tearing apart the cooled cheese. The desired body or texture should approximate the stringiness seen in pulling apart cooked chicken breast. Meltability refers to the ability of shredded strands of mozzarella cheese to melt completely and flow together, so individual strands are no longer present. Stretchability refers to the measurement of the melted cheese fibers as they pull upward from the melted mass. Most customers desire stretchability of from about 6 to about 24 inches; cheese made by methods disclosed herein will have the desired stretchability.

The mozzarella cheese made according to the inventive method can be packaged in any sizes common to the cheese industry and according to the customer's needs. Thus, sizes of 1 oz., 8 oz., 12 oz., 16 oz., 5 lbs., 10 lbs., 20 lbs. and 40 lbs., as well as other sizes, may be prepared. Following are examples of making a mozzarella according to the method of this invention.

II. System for Making Pasta Filata Cheese

Referring now to the drawings, FIG. 1 illustrates an apparatus for producing cheese of the pasta filata type. A pasta filata type cheese is a cheese that is cooked and stretched, such as mozzarella, provolone, blends thereof, or a cheese of this type blended with a cheese analog or imitation cheese.

A. Cyclone

Referring to FIG. 1, a system 10 for producing pasta filata cheese is shown. A cyclone 15 is used to receive cheese curds. In one embodiment, the cheese curds are transported to the cyclone through a tubular structure 20. The cyclone can be made of any suitable material including but not limited to stainless steel.

B. Curd Mill

In one embodiment, the cheese cured moves from the cyclone 15 to a curd mill 25. However, while a curd mill is shown in FIG. 1, a curd mill is not required for the system.

A curd mill may be used to reduce the size of the curd exiting the cyclone. In another embodiment, the curd may be milled prior to being transported to the cyclone. In still another embodiment, a method known as "stirred curd" may be implemented whereby curds are continuously stirred on the whey draining machine so that milling is not required.

In one embodiment, the curd mill 25 cuts the cheese to a pre-determined and desired size. Representative sizes include but are not limited to ⅜"×⅜"×4"; ¾"×¾"×2" and many other sizes.

C. Conveyance System

The cheese curd leaves the curd mill 25 and is placed on a mechanical belt system 26. In one embodiment, cheese curd from the curd mill is deposited onto a section of conveyor belt, designed to give the curd mass a specific width, length, and height. This conveyor belt may have cleats across its width and may have elevated sides to contain the curd.

In one embodiment, the system 10 can include at least one conveyance system for transporting the articles through one or more of the processing zones described herein. Examples of suitable conveyance systems can include, but are not limited to, plastic or rubber belt conveyors, chain conveyors, roller conveyors, flexible or multiflexing conveyors, wire mesh conveyors, bucket conveyors, pneumatic conveyors, screw conveyors, trough or vibrating conveyors, and combinations thereof. The conveyance system can include any number of individual convey lines and can be arranged in any suitable manner within the process vessels. The conveyance system utilized by microwave system 10 can be configured in a generally fixed position within the vessel or at least a portion of the system can be adjustable in a lateral or vertical direction.

The mechanical belt system is used to transport the cheese from one station to the next station in the system. The cheese curd can be transported on the belt at a rate selected from the group consisting of: 5-10 in/min, 10-15 in/min, 15-20 in/min, 20-25 in/min, 25-30 in/min, 30-35 in/min, 35-40 in/min, 40-45 in/min, 45-50 in/min, 50-55 in/min, 55-60 in/min, 60-65 in/min, 65-70 in/min, 70-75 in/min, 75-80 in/min, 80-85 in/min, 85-90 in/min, 90-95 in/min, 95-100 in/min and greater than 100 in/min (see discussion above for complete range).

D. Ingredient Dispenser

The mechanical belt transports the cheese curd from the mill 25 to an ingredient dispenser 30. Various ingredients known to the cheese-making art may be added to achieve the optimum characteristics in the final cheese. Examples of such ingredients include but are not limited to non-fat dry milk, anhydrous milk fat, milk protein concentrate, concentrated milk fat, emulsifier, salt, water, and other ingredients as allowed by current or future standards, and mixtures thereof. For example, addition of non-fat dry milk solids lowers the fat content of the cheese, based on the desired specifications of the finished cheese. Adding non-fat dry milk solids is one way to standardize the fat content of the cheese and to capture more of the nonfat solids. The cheese curd takes up re-hydrated nonfat dry milk more easily and the final cheese avoids watering-off. The fat and water content of the incoming cheese and of the desired final cheese determine the amounts of such ingredients to be added. Often, these ingredients may be functionally interchangeable, and the particular added ingredient may vary according to the desired characteristics of the cheese product and according to the market availability and cost of these ingredients.

If desired, a suitable emulsifier may be added to the curd before it is cooked in the microwave system. In another embodiment, the emulsifier may be added prior to entering the microwave system, after exiting the microwave system or before entering the microwave system and after exiting the microwave system.

Non-limiting examples of suitable emulsifiers include sodium citrate and sodium phosphate, in amounts of between less than about 0.5% to about 3% (the maximum amount allowed by law). If the curd has the correct fat and moisture content when introduced into the microwave system, an emulsifier is generally unnecessary. However, to meet certain customer needs, it may be desirable to adjust the moisture or add additional ingredients to the cheese. In addition, an emulsifier avoids watering-off of the mozzarella, by allowing absorption of added water. When an emulsifier, such as sodium citrate, is added, it is preferably added in a level under 0.5%.

Traditional mozzarella preparation typically uses thermophilic cultures and such cultures may be used in the methods disclosed herein.

Additional examples of ingredients include but are not limited to acidity regulator, an acid, an anticaking agent, an antifoaming agent, a coloring agent, an emulsifier, an enzyme preparation, a flavoring agent, a finning agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral. Examples may further include procream, whey cream, a dairy solid, and foodstuffs of vegetable, fruit and/or animal source. The foodstuffs may include fruit, vegetables, nuts, meat, and spices, among other foodstuffs.

Acidity regulators, anticaking agents and firming agents of various types can be included in the soft or firm/semi-hard ripened or unripened blended cheese. Typically, these agents are inorganic salts, but other types of acidity regulators, anticaking agents and firming agents can also be used. Examples of suitable acidity regulators, anticaking agents and firming agents may include calcium chloride, tricalcium phosphate, and calcium hydroxide, powdered cellulose, disodium phosphate and potassium hydroxide. These agents are typically added as part of a solution, either by incorporation in the slurry or as a liquid. But they can also be added as a powder that is incorporated, for example, into the admixture of the slurry and heated cheese mass at the mixing stage.

The total amount of acidity regulators, anticaking agents and firming agents incorporated is sufficient so the concentration of the acidity regulators, anticaking agents and firming agents in the final cheese product is generally up to about 0.01, 0.5, or 3.0% by weight. More specifically, the amount of acidity regulators, anticaking agents and filming agents can range from about 0.05-3.0%, from about 0.1-2.5%, or from about 0.5-2.0% by weight. This means that the concentration of the acidity regulators, anticaking agents and firming agents in the slurry is typically about 0.01-3.2 wt. %.

A number of different sequestrants can be incorporated into the final cheese product. Sequestrants that can be utilized include, but are not limited to, various phosphate salts (e.g., sodium hexametaphosphate, monosodium phosphate, sodium tripolyphosphate, disodium phosphate, and potassium phosphate), calcium citrate, trisodium citrate, calcium gluconate, oxystearin and sorbitol.

The total amount of sequestrant is usually up to about 0.1, 1, or 4% by weight of the final cheese product. So, for example, the amount of sequestrant in the final cheese product can range from about 0.1 to 4%, from about 0.25 to 3.0%, or from about 0.4 to 2.5% by weight. The concentration of the sequestrants in the slurry itself is typically about 0.1 to about 12% by weight of the slurry.

An acidic agent (an acid) can be incorporated to adjust the pH of the finished cheese to a desired level. The acidity of the cheese can be controlled to help regulate the melt down characteristics of the finished cheese. Various acids can be employed; examples of suitable acids include, but are not limited to, adipic acid, lactic acid, hydrochloric acid, acetic acid, glucano delta lactone, phosphoric acid, lactobionic acid or Genlac C, the latter being a blend of water, citric acid, lactic acid, acetic acid and artificial flavors. Acid is typically added to adjust the pH of the finished cheese to a pH from about 5-6 is reached, and more typically from pH 5.10-5.90.

A colorant can be incorporated into the soft or firm/semi-hard ripened or unripened blended cheese to adjust its natural color. This can be useful, for example, if consumers have a preference for a color other than the naturally-occurring color. Examples of suitable colorants include annatto, tumeric, titanium dioxide, and beta-carotene. Colorants may be of both the natural or artificial color. If one wished to color the cheese a red, an artificial color such as FD&C red #40 can be used. Annatto is useful to give mozzarella cheese the appearance of cheddar. This allows one to produce a cheese for pizza baking that has the desired melt characteristics of mozzarella, but with a different appearance than that of traditional white mozzarella. Annatto-colored mozzarella can be used as a replacement for cheddar cheese in many food products (e.g., Mexican-style prepared foods). Tumeric imparts a yellowish color to cheese. The yellowish color often is preferred by consumers who perceive it to indicate a "richer" product upon cooking on a pizza. Colorants such as annatto and tumeric can be obtained, for example, from Chris Hansens Labs of Milwaukee, Wis.

Various flavoring agents can also be incorporated into the cheese to tailor the flavor profile of the cheese to meet consumer preferences. Suitable flavors for mixing into the heated cheese include, for example, cheddar cheese flavor and parmesan cheese flavor. Flavoring agents are typically added in an amount such that the concentration in the final cheese product is within the range of about 0.01 to 5 wt. %. If incorporated into the slurry, the concentration of the flavoring agent in the slurry is generally is in the range of about 0.11-4.50 wt. %.

E. Microwave System

The mechanical belt system 26 transports the cheese curd from the ingredient dispenser 30 to the microwave system 40. The microwave treatment can be carried out in an oven. Conveniently, a tunnel microwave oven can be used, inside of which a conveyor belt is made to run. In one embodiment, the belt carries a plurality of divided cavities filled with cheese. In one embodiment, the cavities, if made of stainless steel, may be feature a non-stick coating.

During the microwave treatment, the water molecules contained in the cheese evaporate very easily, due to the very high specific surface area of the product. In this way, it is possible to control the supply of energy so that the organoleptic and nutritional properties of the product are not damaged in any way.

Any microwave system that provides continuous and uniform heating can be used. Sources of microwave energy are available from a variety of industrial microwave manufacturers.

In one embodiment, the microwave system 40 may contain an exhaust vent 45 to dispel excess heat.

In another embodiment, the microwave system can include one or more temperature sensors. In one embodiment, the microwave system roof can include 3 infrared temperature sensors, located with one in the center line of the belt, and one 30 cm's each side of center. Infrared sensors to be mounted using tri clamp ferrule design for easy removal for cleaning.

A microwave system will first raise the temperature of water-phase and with it the water soluble enzymes. This results in more efficient denaturation of the proteolytic enzymes. This reduction of the residual enzymes results in more moderate protein breakdown.

a. Chamber/Housing for the Microwave Energy Source

In one embodiment, the microwave energy source is contained in a chamber or housing. In one embodiment, the housing a cavity for containing the microwave energy source. In one embodiment, the cavity is from about 100 cm to about 400 cm long. In one embodiment, the cavity is about 250 cm long for containing the microwave energy source.

In another embodiment, the housing can support a conveyor assembly. In another embodiment, the conveyor assembly is from about 22 cm wide to about 225 cm wide. In one embodiment, the conveyor assembly is about 125 cm wide.

In one embodiment, the nominal height of the belt deck is from about 22 cm high to about 225 cm high from the floor. In yet another embodiment, the nominal height of the belt deck is from about 125 cm high from the floor.

In one embodiment, the belt assembly can be made from white polypropylene. In another embodiment, the belt assembly can contain side guards. In one embodiment, the housing can be made of 304 stainless steel.

In one embodiment, the housing frame structure can be manufactured from 7 ga stainless steel with sloped horizontal surfaces, and "Open" design, with all flat surfaces to be faced to the inside of the frame.

In another embodiment, the housing can include one or more temperature sensors. In one embodiment, the microwave system roof can include 3 infrared temperature sensors, located with one in the center line of the belt, and one 30 cm's each side of center. Infrared sensors to be mounted using tri clamp ferrule design for easy removal for cleaning.

In one embodiment, the housing can have dual microwave safe access door assemblies located in the front panel of the main oven cavity to allow easy access to the interior of the oven for sanitary needs.

In one embodiment, the housing includes 3" tri-clamp ferrules approx. 6" in length and mounted in the oven back wall below the oven belt level for air extraction. Each ferrule to be ground and polished at the oven wall to remove all rough surfaces.

b. Microwave Energy Source

Any microwave energy source that provides continuous and uniform heating can be used. Sources of microwave energy are available from a variety of industrial microwave manufacturers.

In one embodiment, the microwave energy source can be 75 kW continuous duty microwave transmitter assy operating at 915 MHz. In one embodiment, the system can comprise more than one microwave transmitter. In yet another embodiment, the microwave energy source can have 106 kva 12 pulse HV transformer assembly with full DC bridge rectifier assembly.

In one embodiment, the chamber can comprise a 75 kW continuous duty microwave transmitter assy operating at 915 MHz.

In yet another embodiment, the housing can comprise a 75 kW continuous duty microwave transmitter assy operating at 915 MHz.

In one embodiment, the microwave energy source can have a stainless steel cooling pump assembly with machined aluminum manifold distribution system.

In yet another embodiment, the microwave energy source can have a 4 Amp 30 kV rectifier assy for air cooling uniformity.

In still yet another embodiment, the microwave energy source can have a high efficiency w/w heat exchanger system.

F. Augers

Returning to FIG. 1, the cheese curd exits the microwave system 40 and is transported by the belt 26 to the mechanical augers, which stretch the cooked and/or melted cheese curd. In the methods and systems disclosed herein, the lowest possible auger speed assures even mixing and melting of the curd without lowering the fat and moisture content to below that desired for the final mozzarella cheese. The auger speed for the methods disclosed herein can be lowered. In one embodiment, the auger speeds range from about 6 to about 26 RPM. Higher speeds tended to mash the curd together and to squeeze out needed fat and moisture. The inventive method needs only the lowest auger speed to assure even mixing and melting of the curd without lowering the fat and moisture content to below that desired for the final pasta filata cheese.

G. Clean-In-Place System

Finally, the mechanical belt 26 is cleaned by a Clean-In-Place system, which contains various detergents and agents for removing any residual cheese pieces. After the belt is exposed to the detergents, at least one rinse is performed with clean water to ensure no detergents remain on the belt. One of ordinary skill in the art will understand how to optimize and customize the Clean-In-Place system to ensure that residual cheese flakes and/or parts are removed and at the same time, no residual detergent remains on the belt.

III. Circular System for Making Pasta Filata Cheese

Figure 2:
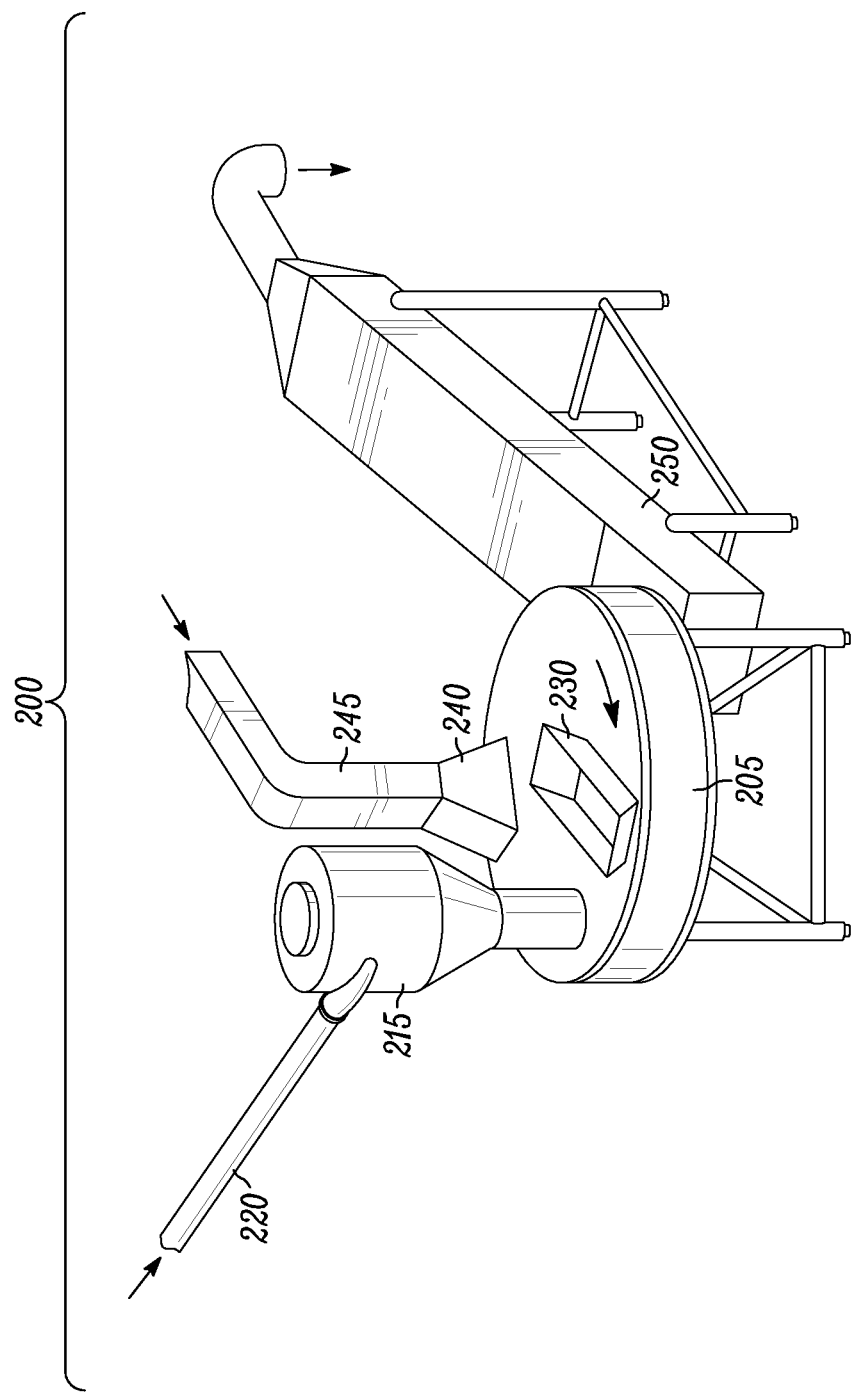
FIG. 2 is a representative depiction of a circular housing for the production of pasta filata cheese with a microwave energy source to heat the cheese curd.

Turning now to FIG. 2, a system 200 is shown for producing pasta filata cheese. The system 200 comprises a circular housing 205 comprising an ingredient dispenser 230, a cyclone 215, and a microwave system 240. A microwave duct 245 extends from the microwave system 240.

The circular housing 205 is coupled to a housing 250 comprising augers for stretching and mixing the cooked and/or melted cheese. In one embodiment, the cyclone 215 has a tubular structure 220 for transporting the cheese into the cyclone.

The circular housing 205 comprises a solid disk with certain cavities therein for metering a specific quantity of curd so that the cheese curd is transported from one location to the next. The circular housing 205 can be set-up such that the disk rotates in a clockwise or a counterclockwise fashion, provided the last station in the housing is the microwave system.

IV. System for Making Pasta Filata Cheese with a Product Leveling System

In one embodiment, the disclosure relates to a system comprising (a) a product leveler for creating a uniform heating profile of cheese curd; (b) a sensor for determining the characteristics of the cheese curd after exposure to the produce leveler; and (c) a microwave system for heating cheese curd.

In still another embodiment, the disclosure relates to a system comprising a cyclone for separation of cheese curd; a product leveler for creating a uniform heating profile of the cheese curd from the cyclone; a sensor for determining the characteristics of the cheese curd after exposure to the product leveler; and a microwave system for heating cheese curd.

In still another embodiment, the disclosure relates to a system comprising a cyclone for separation of cheese curd; a product leveler for creating a uniform heating profile of the cheese curd from the cyclone; a sensor for determining the characteristics of the cheese curd after exposure to the product leveler; a dispenser for adding ingredients to the cheese curd after exposure to the product leveler; and a microwave system for heating cheese curd. In one embodiment, the system further comprises a temperature meter for determining the temperature of the cheese curd exiting the microwave system. In yet another embodiment, the system further comprises a blending machine for stretching and blending the cooked cheese curd after exiting the microwave system.

In still another embodiment, the system further comprises a conveyance system for transporting the cheese curd from one function to the next.

In still another embodiment, the disclosure relates to a system comprising a first station having a cyclone for separation of cheese curd; a second station having a product leveler for creating a uniform heating profile of the cheese curd from the cyclone; a third stating having a sensor for determining the characteristics of the cheese curd after exposure to the product leveler; a fourth station having a dispenser for adding ingredients to the cheese curd after exposure to the product leveler; and a fifth station having a microwave system for heating cheese curd. In another embodiment, the cheese curd is transported from station to station with the use of a conveyance system.

Figure 3:
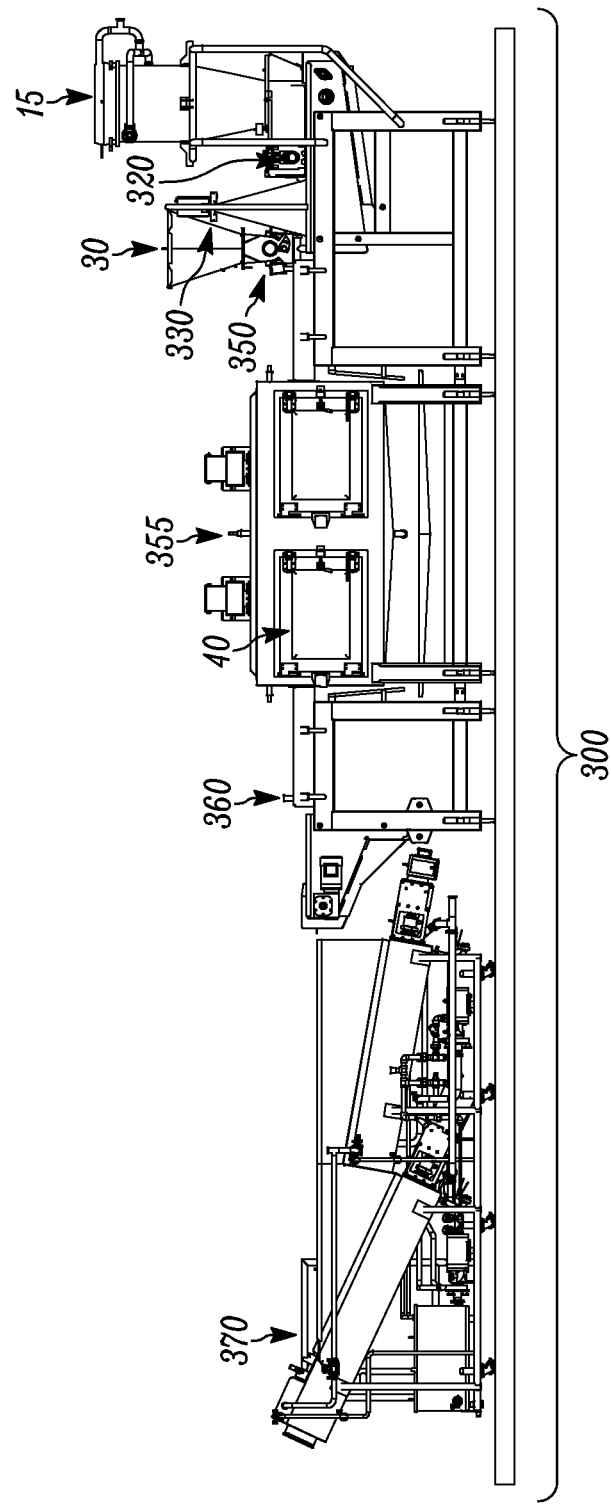
FIG. 3 is a representative depiction of a system for production of pasta filata cheese with a product leveling system and a chamber containing a microwave energy source.

Turning now to FIG. 3, a system 300 is shown for making pasta filata cheese. In one embodiment, the incoming dairy product, in this example, cheese curd is dispensed into a cyclone receiver 15. Cheese curd comes down a cyclone 15 to a product leveling system 320 that disperses the product across the belt.

In one embodiment, the product leveling system creates cheese curd with a uniform heating profile.

In one embodiment, the product leveling system levels the cheese curd to a desired shape, size and/or volume. A consistent shape, size and/or volume of the cheese curd allows for consistent heating of the cheese curd.

A 3D sensor 330 evaluates the cheese curds shape, size and/or volume. The 3D sensor 330 can be a sensor that use reliable time-of-flight distance measurement. In one embodiment, the 3D sensor 330 provide integrated 64×48 pixel array and projects 3072 points of reference. The 3D sensor 330 can be designed to withstand harsh indoor and outdoor environments. The 3D sensor 330 provides switching and analog outputs for application versatility.

In one embodiment, the system comprises an ingredient dispenser 30 for adding ingredients, as discussed above, to the cheese curd. In another embodiment, a temperature meter 350 measures the temperature of the cheese curd.

In yet another embodiment, the system 300 comprises a chamber comprising a microwave system 40. In another embodiment, the system comprises a temperature meter 355 for monitoring the temperature inside the chamber. In still another embodiment, the system comprises a temperature meter 360 for measuring the temperature of the cheese curd as it exits the microwave system 40. Finally, the system can also comprise a blending machine 370.

Figure 4:
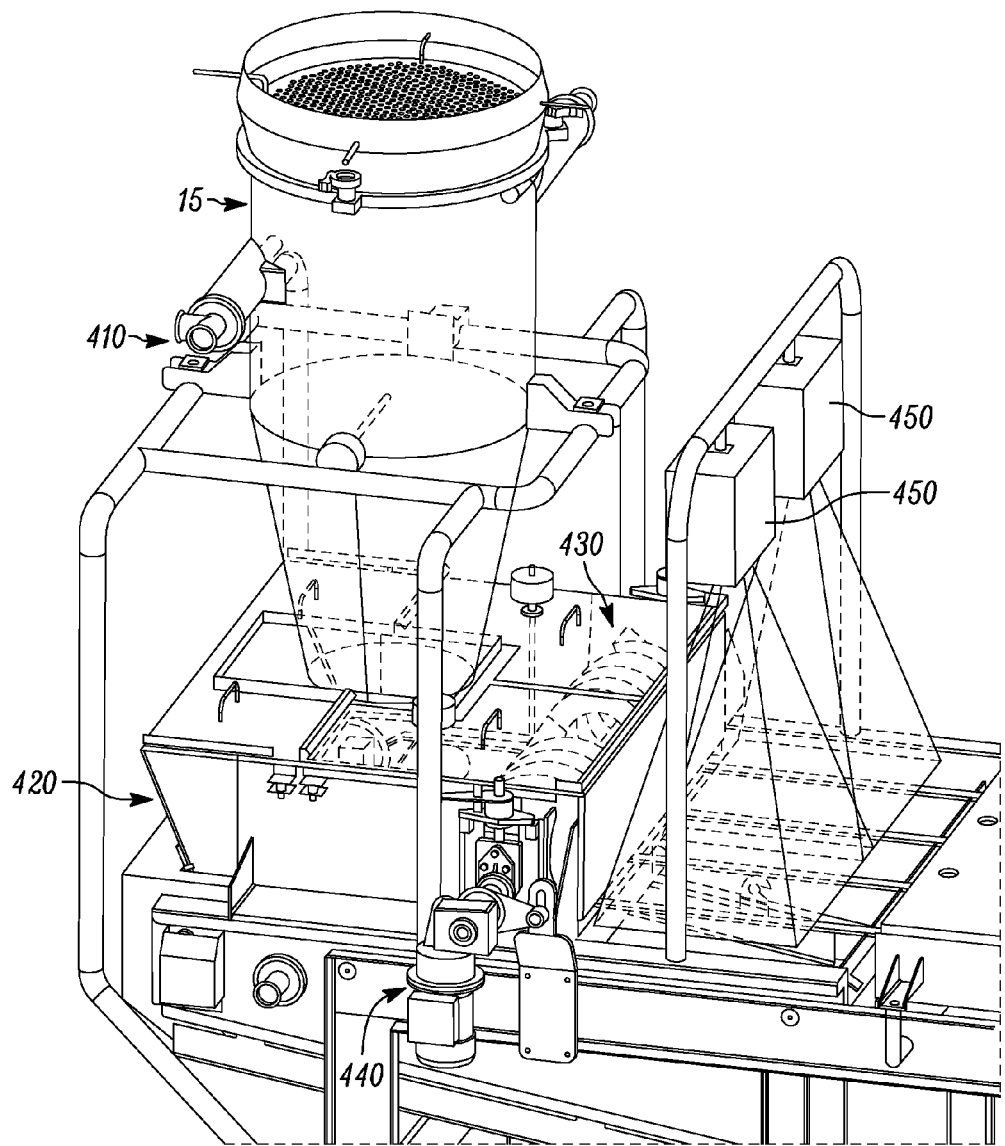
FIG. 4 is a representative depiction of a product leveling system using a product leveling auger.

FIG. 4 provides a representative design of the product leveling system. A cyclone 15 distributes the cheese curd onto a platform. The cyclone 15 has a product inlet to receive the cheese curd 410. An inlet hopper 420 is also present.

The cheese curd moves to a product leveling system. In one embodiment, the product leveling system is a product leveling auger 430 with a combination of flights and paddles to distribute the cheese curd across the width of the conveyor belt. A drive motor 440 powers the leveling auger.

In one embodiment, the cheese curd is deposited in the center portion of the conveyor belt at the bottom outlet of the cyclone receiver. The center of the auger has paddles to stir the cheese. When there is enough of a volume of product to spill to the sides, flights on the auger pull the cheese curd toward the outer edges of the belt. Paddles are positioned at each end of the auger to stir the product and to minimize excessive build-up.

Two 3D sensors 450 evaluates the cheese curds shape, size and/or volume. The 3D sensors 450 can be a sensor that use reliable time-of-flight distance measurement. In one embodiment, the 3D sensors 450 provide integrated 64×48 pixel array and projects 3072 points of reference. The 3D sensors 450 can be designed to withstand harsh indoor and outdoor environments. The 3D sensors 450 provides switching and analog outputs for application versatility.

In one embodiment, the system can comprise one or more sensors. In yet another embodiment, the system can comprise 1, 2, 3, 4, 5, 6, 7, 8, 9, 10, or greater than 10 sensors.

In one embodiment, the system can comprise one or more 3D sensors. In yet another embodiment, the system can comprise 1, 2, 3, 4, 5, 6, 7, 8, 9, 10, or greater than 10 3D sensors.

V. General Procedure for Production of Cheese Curd

A general and representative procedure for the production of cheese curd is provided below. The information below is not intended to limit the scope of the application in any manner.

Starting from cow's milk or buffalo milk, or mixed milk having a 0-10% fat content and 2.5-5% protein content, after filtration, the milk is optionally pasteurized following usual procedures or submitted to ultrafiltration, microfiltration and other similar procedures. Once the milk source characteristics have been determined, the milk is brought to a temperature of 33°-37° C. Then the addition of cultures of bacteric and/or selected ferments is carried out, which operation generally takes place 20-30 minutes before the addition of rennet so as to give the milk a mass of very active microorganisms that can give fermentation the desired orientation at once.

Generally, cultures of bacteria mainly consisting of Streptococcus thermophilus and a minor part of Lactobacillus helvetitus or Lactobacillus bulgaricus are used. The acidity of said bacteria cultures added to the milk at the rate of 2-3%, ranges from 14° to 24° SH/50 ml. It is however also possible to act in such a manner that the acidifying action carried out by milk ferments is replaced by the addition of organic acids to the milk. This addition must take place in such a way to avoid concentration gradients that can give rise to the formation of flocculations. It is therefore suitable to undertake a slow addition of acids suitably diluted in water to the milk remaining under constant and quick stirring. Acetic acid or citric acid may be considered as appropriate and the pH value ranges from 5.5 to 5.8.

Next, to the milk thus obtained, rennet of various titre and characteristics and in variable doses is then added. Curdling takes place at a temperature of about 33°-37° C., it requires a period of time of about 45 minutes and enables a soft but elastic curd to be achieved. In any case, rennet amount and curdling temperature and time may vary depending on the milk characteristics and on the particular features to be achieved in the finished product.

After the soft gel (curd) hardening step, the curd can be cut. The first cutting together with a short rest (5 to 10 minutes) enables the whey drain off to start. Then there is a second cutting. The final result is a curd suspension consisting of grains of variable size depending upon the desired final product. Eventually, the curd may be allowed to settle on the cheese vat bottom in order to enable it "to build itself up" and start ripening. Depending on type of vat, the curd may be continuously stirred to prevent the curd from combining into large lumps.

The methods and systems disclosed herein are further described by the following paragraphs.

1. A method for making pasta filata cheese comprising heating cheese curd with microwave energy.

2. A method for making pasta filata cheese comprising heating cheese curd in a chamber containing a microwave energy source.

3. A method for making pasta filata cheese comprising transporting cheese curd from a cyclone to a microwave system; and heating cheese curd in the microwave system.

4. A method for making pasta filata cheese comprising supplying cheese curd to a cyclone; transporting cheese curd with a conveyance system from the cyclone to a chamber comprising a microwave energy source; and heating the cheese curd in the chamber.

5. A method comprising leveling dairy product; using one or more sensors to determine if the dairy product has a uniform heating profile, and heating the dairy product using microwave energy.

6. A method comprising (a) leveling dairy product to a desired shape, size or volume; (b) using one or more sensors to determine if the dairy product of step (a) has a uniform heating profile, and (c) heating the dairy product using microwave energy.

7. A method comprising leveling cheese curd to create a uniform heating profile; using one or more sensors to determine if the dairy product has a uniform heating profile; and heating the cheese curd using microwave energy.

8. A method comprising manipulating dairy product to a desired shape, size or volume; and heating the dairy product with microwave energy.

9. A method comprising manipulating dairy product to a create a uniform heating profile; and heating the dairy product with microwave energy.

10. A method comprising manipulating dairy product to a desired shape, size or volume; using a sensor to determine the characteristics of the dairy product; and heating the dairy product with microwave energy.

11. A method comprising manipulating dairy product to a desired shape, size or volume; using a sensor to determine if the cheese curd has a uniform profile; and heating the dairy product with microwave energy.

12. The method of any of paragraphs 1-11 wherein heating the cheese curd raises the temperature of the cheese curds from about 5 to about 50° C., from about 10 to about 45° C., from about 15 to about 40° C., from about 20 to about 35° C., and from about 25 to about 30° C.

13. The method of any of paragraphs 1-12, further comprising measuring the temperature of the dairy product before and after heating with microwave energy.

14. The method of any of paragraphs 1-13, wherein leveling the cheese curd comprises using a product leveling system.

15. The method of any of paragraphs 1-14, wherein leveling the cheese curd comprises using one or more augers.

16. The method of any of paragraphs 1-15, wherein manipulating the cheese curd comprises using a product leveling system.

17. The method of any of paragraphs 1-16, wherein manipulating the cheese curd comprises using one or more augers.

18. The method of any of paragraphs 1-17, wherein the sensor is a three-dimensional sensor.

19. The method of any of paragraphs 1-18, further comprising adding ingredients to the product prior to heating.

20. The method of any of paragraphs 1-19, further comprising stretching the product after heating.

21. The method of any of paragraphs 1-20, further comprising transporting the dairy product to a cyclone prior to manipulating or leveling the cheese curd.

22. The method of any of paragraphs 1-21 further comprising blending the product after heating.

23. The method of any of paragraphs 1-22, wherein the microwave energy operates from about 30 kw to about 300 kw, from about 40 kw to about 290 kw, from about 50 kw to about 280 kw, from about 60 kw to about 270 kw, from about 70 kw to about 260 kw, from about 80 kw to about 250 kw, from about 90 kw to about 240 kw, from about 100 kw to about 230 kw, from about 110 kw to about 220 kw, from about 120 kw to about 210 kw, from about 130 kw to about 200 kw, from about 140 kw to about 190 kw, from about 150 kw to about 180 kw, and from about 160 kw to about 170 kw.

24. The method of any of paragraphs 1-23, wherein the dairy product is cheese curd.

25. A system comprising a product leveling apparatus for creating a uniform profile of cheese curd and a microwave energy source for heating the cheese curd received from the product leveling apparatus.

26. A system comprising a product leveling apparatus for creating a uniform profile of cheese curd and a chamber comprising a microwave energy source for heating the cheese curd.

27. A system comprising a product leveling apparatus for shaping cheese curd, a sensor to determine the profile or characteristics of the cheese curd, and a microwave energy system for heating the cheese curd.

28. A system comprising a product leveling apparatus, a chamber comprising a microwave energy source for heating cheese curd received from the product leveling apparatus and a conveyance system for transporting cheese curd from the product leveling system to chamber.

29. A system comprising a cyclone for receiving cheese curd, a product leveling system for shaping cheese curd received from the cyclone, a chamber comprising a microwave system, and a conveyance system for transporting the cheese curd from the cyclone to the product leveling system and from the product leveling system to the chamber.

30. A system comprising a cyclone for receiving cheese curd, a product leveling system for shaping cheese curd received from the cyclone, a sensor for determining the prolife of the cheese curd, a chamber comprising a microwave system, and a conveyance system for transporting the cheese curd from location to location.

31. A system comprising a cyclone for receiving cheese curd, a product leveling system for shaping cheese curd received from the cyclone, a sensor for determining the prolife of the cheese curd, a first temperature meter for measuring the temperature of the shaped cheese curd, a chamber comprising a microwave system for heating the shaped cheese curd, a second temperature meter for measuring the temperature of the heated cheese curd, and a conveyance system for transporting the cheese curd from location to location.

32. A system comprising a cyclone for receiving cheese curd, a product leveling system for shaping cheese curd received from the cyclone, a sensor for determining the prolife of the cheese curd, a dispenser for adding one or more ingredients to the cheese curd, a chamber comprising a microwave system, and a conveyance system for transporting the cheese curd from location to location.

33. A system comprising a cyclone for receiving cheese curd, a product leveling system for shaping cheese curd received from the cyclone, a sensor for determining the prolife of the cheese curd, a dispenser for adding one or more ingredients to the cheese curd, a first temperature meter for measuring the temperature of the shaped cheese curd, a chamber comprising a microwave system for heating the shaped cheese curd, a second temperature meter for measuring the temperature of the heated cheese curd, and a conveyance system for transporting the cheese curd from location to location.

34. The system of any of paragraphs 25-33 further comprising a blending machine for blending or stretching the heated cheese curd.

35. The system of any of paragraphs 25-34 further comprising a dispenser for adding ingredients to the cheese curd.

36. The system of any of paragraphs 25-35 further comprising a first temperature meter for measuring the temperature of the cheese curd prior to heating.

37. The system of any of paragraphs 25-36 further comprising a second temperature meter for measuring the temperature of the cheese curd after heating.

38. The system of any of paragraphs 25-37 further comprising a three dimensional sensor for determining the profile of the cheese curd.

39. A system comprising a product leveling apparatus for creating a uniform profile of cheese curd and a microwave energy source for heating the cheese curd.

40. A system comprising a product leveling apparatus for creating a desired shape, size or volume of cheese curd, a sensor to determine the profile of the cheese curd, and a microwave energy system for heating the cheese curd.

41. A system comprising a cyclone for receiving cheese curd, a product leveling system for shaping cheese curd received from the cyclone, a chamber comprising a microwave system for heating the cheese curd, and a conveyance system for transporting the cheese curd from the cyclone to the product leveling system and from the product leveling system to the chamber.

42. A system comprising a product leveling apparatus for creating a desired shape, size or volume of cheese curd and a chamber comprising two or more microwave energy sources for heating the cheese curd.

The disclosure is now described with reference to the following Examples. These Examples are provided for the purpose of illustration only and the invention should in no way be construed as being limited to these Examples, but rather should be construed to encompass any and all variations that become evident as a result of the teaching provided herein. All references including but not limited to U.S. patents, allowed U.S. patent applications, or published U.S. patent applications are incorporated within this specification by reference in their entirety.

EXAMPLES

The following examples are illustrative only and are not intended to limit the scope of the invention as defined by the claims.

Example 1

Commercially available cheese curd was purchased for use in an initial testing for the feasibility of heating cheese curds using microwave technology. Due to limited access to curd, the curd was purchased from a Wisconsin company and was made as a "fresh cheese" rather than a standard Low Moisture Part Skim mozzarella (LPMS). A variety of samples were made including unstretched curd, curd with no salt and exposed to microwave energy, curd with some pre-salt and exposed to microwave energy, and fully pre-salted curd exposed to microwave energy.

The curd was milled, salted depending on which test was being performed, exposed to microwave energy and then run through a molder body that was to act as a mixer for the curd. The microwave energy source operated at about 75 kW.

The curd exited the mixer body through a 4" ferrule and was then hand cut and placed in a 4-in-1 cheese mold. The molds were placed in a chilled water tank, and later, depending on the test, placed in a brine tank for brining.

Below is a summary of the various testing parameters:
1. 'Wisconsin' curd sample:
Raw cheese: Good Flavor, white color, delicate texture.

Pizza: Tiny blisters, golden brown, no skinning, very short, brittle stretch, watery, mushy, soupy, no salt, flat.

2. pH 6.6 tempered:

Raw cheese: yellow curd, gel formation on surface of the curd.

Pizza: a few more blisters that the 'Wisconsin' control curd, short, soupy, mushy stretch, no body, lots of free water, blisters are much darker than 'Wisconsin' curd sample.

3. No salt, no brine, water chill:

Raw Cheese: cheese had lots of free moisture when left at room temperature, had some fibrous chicken breast texture, delicate, milky flavor, texture breaks down easily, similar to fresh mozzarella.

Pizza: soupy, flowey off crust, oiled off considerably, had translucent appearance, no body, weak, soupy, watery, very slight string.

4. No presalt, 5 hr. brine:

Raw Cheese: very rough tear, mealy texture, sweet, milky flavor, salty.

Pizza: Oily, some blisters, more stretch, weak, pooling of water, some integrity to chew and mouth feel, buttery flavor. Best pizza performance of all the samples.

5. 2% presalt, no brine:

Raw cheese: Lots of air incorporation (holes), looks fibrous, very delicate chew, curd falls apart in mouth, salty, buttery, clean flavor, extremely soft texture.

Pizza: bigger, darker blisters, flow off crust, lots of free oil release, some translucent look, soupy, very weak stretch, buttery, salty.

6. 1% presalt, 20 hr. brine:

Raw cheese: Evidence of massive moisture migration in the cheese, discolored swirls, dark colored firm area, white colored soft area. some pasta filata texture, super salty, wet area had no body, dry area had firm body.

Pizza: slight blistering, high salt prevented complete melt, some skin formation, slight stretch, stretch had some tenting, had some elasticity, slightly tough, some shred identity (undermelt), super salty. Showing gel formation on pH 6.6 tempered cheese. Showing yellowing of color of pH 6.6 tempered cheese.

This disclosure describes the method of this invention with reference specifically to the preparation of mozzarella cheese. However, the methods may produce any other pasta filata cheese. It may be necessary to make appropriate adjustments to the moisture, salt, fat and pH of the natural curd and/or to the melt in the microwave system, as will be better understood with reference to the following discussion. It may also be necessary to make appropriate adjustments to the curing of the cheese in order to prepare a semi-hard or cured pasta filata, such as provolone.

Example 2

Methods

Further production trials were conducted exposing from 4,000 to 6,000 pounds of curd per hour to microwave energy. In these trials, low moisture, part skim (LMPS) mozzarella was used with curd being delivered in both a milled curd and loose, stirred curd format. The microwave system used had the following characteristics:

Heating chamber length: 48 inches;
Belt width: 24 inches;
Belt speed: 70 in/min;
Product height: nominal 2 inches with estimated variations of +0.2 inches and −1.00 in;
Cheese curd=26.0-28.0 cubic inches per pound (usually 26.5 cu.in./lb);
Cheese curd entered the microwave system at about 90°-95° C.; and
Cheese exited our oven at about 116°-123° C.

The microwave energy source operated from about 68 kW to about 70 kW. The amount of energy needed to cook the cheese curd was about 1.25 kW/lb of curd.

Results

In all cases, the production trials produced cheese with the same characteristics as LMPS mozzarella produced by traditional means with the exception of grating improved fat retention in the subject microwave samples.

Example 3

The applied microwave energy, the length of the heating chamber, the time the product remains in the heating chamber, and the amount of product in the chamber are all related variables. Adjusting one variable, such as the amount of microwave energy applied, will likely require some adjustment of the other variables. Tables I-III correlate the time the curd remains in the chamber with the microwave energy that will be applied.

TABLE I

Correlation of microwave energy that will be applied with time in heating chamber

| Microwave Energy applied in kW | Length of Heating Chamber (inches) | Time in Chamber in Second | Pounds of Curd in Chamber | Belt Speed (Inches/min) 24 inch wide belt |
|---|---|---|---|---|
| 10 | 48 | 279.8 | 50.02 | 10.3 |
| 20 | 48 | 139.9 | 50.02 | 20.6 |
| 30 | 48 | 93.3 | 50.02 | 30.9 |
| 40 | 48 | 69.9 | 50.02 | 41.2 |
| 50 | 48 | 56.0 | 50.02 | 51.5 |
| 60 | 48 | 46.6 | 50.02 | 61.8 |
| 70 | 48 | 40.0 | 50.02 | 72.1 |
| 80 | 48 | 35.0 | 50.02 | 82.4 |
| 90 | 48 | 31.1 | 50.02 | 92.6 |
| 100 | 48 | 28.0 | 50.02 | 102.9 |
| 110 | 48 | 25.4 | 50.02 | 113.2 |
| 120 | 48 | 23.3 | 50.02 | 123.5 |
| 130 | 48 | 21.5 | 50.02 | 133.8 |
| 140 | 48 | 20.0 | 50.02 | 144.1 |
| 150 | 48 | 18.7 | 50.02 | 154.4 |
| 160 | 48 | 17.5 | 50.02 | 164.7 |
| 170 | 48 | 16.5 | 50.02 | 175.0 |
| 180 | 48 | 15.5 | 50.02 | 185.3 |

TABLE II

Representative cooking times using a 48 inch chamber and a 48 inch conveyor melt

| Microwave Energy applied in kW | Length of Heating Chamber (inches) | Time in Chamber in Second | Pounds of Curd in Chamber | Belt Speed (Inches/min) 48 inch wide belt |
|---|---|---|---|---|
| 10 | 48 | 608.2 | 108.75 | 4.7 |
| 20 | 48 | 304.1 | 108.75 | 9.5 |
| 30 | 48 | 202.7 | 108.75 | 14.2 |
| 40 | 48 | 152.1 | 108.75 | 18.9 |
| 50 | 48 | 121.6 | 108.75 | 23.7 |
| 60 | 48 | 101.4 | 108.75 | 28.4 |
| 70 | 48 | 86.9 | 108.75 | 33.1 |
| 80 | 48 | 76.0 | 108.75 | 37.9 |
| 90 | 48 | 67.6 | 108.75 | 42.6 |

TABLE II-continued

Representative cooking times using a 48 inch chamber and a 48 inch conveyor melt

| Microwave Energy applied in kW | Length of Heating Chamber (inches) | Time in Chamber in Second | Pounds of Curd in Chamber | Belt Speed (Inches/min) 48 inch wide belt |
|---|---|---|---|---|
| 100 | 48 | 60.8 | 108.75 | 47.3 |
| 110 | 48 | 55.3 | 108.75 | 52.1 |
| 120 | 48 | 50.7 | 108.75 | 56.8 |
| 130 | 48 | 46.8 | 108.75 | 61.6 |
| 140 | 48 | 43.4 | 108.75 | 66.3 |
| 150 | 48 | 40.5 | 108.75 | 71.0 |
| 160 | 48 | 38.0 | 108.75 | 75.8 |
| 170 | 48 | 35.8 | 108.75 | 80.5 |
| 180 | 48 | 33.8 | 108.75 | 85.2 |

TABLE III

Representative cooking times using a 96 inch chamber and a 48 inch conveyor melt

| Microwave Energy applied in kW | Length of Heating Chamber (inches) | Time in Chamber in Second | Pounds of Curd in Chamber | Belt Speed (Inches/min) 48 inch wide belt |
|---|---|---|---|---|
| 10 | 96 | 1218 | 217.75 | 4.7 |
| 20 | 96 | 609 | 217.75 | 9.5 |
| 30 | 96 | 406 | 217.75 | 14.2 |
| 40 | 96 | 305 | 217.75 | 18.9 |
| 50 | 96 | 244 | 217.75 | 23.7 |
| 60 | 96 | 203 | 217.75 | 28.4 |
| 70 | 96 | 174 | 217.75 | 33.1 |
| 80 | 96 | 152 | 217.75 | 37.9 |
| 90 | 96 | 135 | 217.75 | 42.6 |
| 100 | 96 | 122 | 217.75 | 47.3 |
| 110 | 96 | 111 | 217.75 | 52.1 |
| 120 | 96 | 102 | 217.75 | 56.8 |
| 130 | 96 | 94 | 217.75 | 61.6 |
| 140 | 96 | 87 | 217.75 | 66.3 |
| 150 | 96 | 81 | 217.75 | 71.0 |
| 160 | 96 | 76 | 217.75 | 75.8 |
| 170 | 96 | 72 | 217.75 | 80.5 |
| 180 | 96 | 68 | 217.75 | 85.2 |

By increasing the energy at which the microwave energy source operates, the amount of time the cheese curd remains in the heating chamber may be reduced. If the length of the heating chamber increases, the amount of energy that will be applied may vary as well as the heating time in the chamber.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations that operate according to the principles of the invention as described. Therefore, it is intended that this invention be limited only by the claims and the equivalents thereof. The disclosures of patents, references and publications cited in the application are incorporated by reference herein.

What is claimed is:

1. A method for making pasta filata cheese comprising:
 (a) using one or more augers to manipulate and level cheese curd to a uniform profile; and
 (b) heating the cheese curd of step (a) with microwave energy.

2. The method of claim 1, wherein manipulating cheese curd further creates a uniform heating profile of the cheese curd.

3. The method of claim 1, further comprising using a sensor to determine a profile of the cheese curd prior to step (b).

4. The method of claim 1, further comprising step (c) of stretching the cooked cheese curd.

5. The method of claim 1, wherein heating the cheese curd raises the temperature of the cheese curd from about 5° C. to about 60° C.

6. The method of claim 1, wherein heating the cheese curd with microwave energy comprises using a microwave energy source that operates at a power rate selected from the group consisting of: from about 30 kw to about 300 kw, from about 40 kw to about 290 kw, from about 50 kw to about 280 kw, from about 60 kw to about 270 kw, from about 70 kw to about 260 kw, from about 80 kw to about 250 kw, from about 90 kw to about 240 kw, from about 100 kw to about 230 kw, from about 110 kw to about 220 kw, from about 120 kw to about 210 kw, from about 130 kw to about 200 kw, from about 140 kw to about 190 kw, from about 150 kw to about 180 kw, and from about 160 kw to about 170 kw.

7. The method of claim 1 wherein heating the cheese curd with microwave energy comprises using a microwave energy source that operates at a power rate from about 30 kw to about 300 kw.

8. The method of claim 1 wherein heating the cheese curd with microwave energy comprises using a microwave energy source that operates at a power rate from about 50 kw to about 280 kw.

9. The method of claim 1 wherein heating the cheese curd with microwave energy comprises using a microwave energy source that operates at a power rate from about 70 kw to about 260 kw.

10. A method for making pasta filata cheese comprising:
 (a) using a product leveling system comprising an auger to produce cheese curd with a uniform heating profile; and
 (b) heating cheese curd from step (a) in a chamber comprising a microwave energy source.

11. The method of claim 10, wherein heating cheese curd from step (a) in a chamber comprising a microwave energy source comprises operating the microwave energy source at a power rate selected from the group consisting of: from about 30 kw to about 300 kw, from about 50 to about 225 kw, from about 55 to about 220 kw, from about 60 to about 215 kw, from about 65 to about 210 kw, from about 70 to about 200 kw, from about 75 to about 195 kw, from about 80 to about 190 kw, and from about 85 to about 185 kw.

12. The method of claim 10, wherein heating cheese curd from step (a) in a chamber comprising a microwave energy source comprises operating the microwave energy source from about 63 to about 77 kw, and further wherein about 5,580 to about 6,820 pounds of cheese curd per hour is heated in the chamber.

13. The method of claim 10, wherein heating cheese curd from step (a) in a chamber comprising a microwave energy source comprises operating the microwave energy source from about 98 to about 182 kw, and further wherein about 8,680 to about 16,120 pounds of cheese curd per hour is heated in the chamber.

14. The method of claim 10, if wherein heating cheese curd from step (a) in a chamber comprising a microwave energy source comprises operating the microwave energy source from about 56 to about 308 kw, and further wherein from about 5,000 to about 27,280 pounds of cheese curd per hour is heated in the chamber.

* * * * *